(12) United States Patent
Yoshida

(10) Patent No.: US 7,136,035 B2
(45) Date of Patent: Nov. 14, 2006

(54) PROJECTION TYPE DISPLAY, A DISPLAY AND A DRIVE METHOD THEREOF

(75) Inventor: Shohei Yoshida, Nagano (JP)

(73) Assignee: Seiko Epson Corporation, Tokyo (JP)

(*) Notice: Subject to any disclaimer, the term of this patent is extended or adjusted under 35 U.S.C. 154(b) by 513 days.

(21) Appl. No.: 10/310,043

(22) Filed: Dec. 5, 2002

(65) Prior Publication Data
US 2003/0142275 A1    Jul. 31, 2003

(30) Foreign Application Priority Data

Dec. 11, 2001 (JP) ............................. 2001-377828
Dec. 17, 2001 (JP) ............................. 2001-383721

(51) Int. Cl.
  *G09G 3/36*    (2006.01)
(52) U.S. Cl. .................. 345/87; 345/32; 348/751; 353/31
(58) Field of Classification Search .................. 345/32, 345/87; 348/743, 751; 353/31, 20, 38; 349/8
See application file for complete search history.

(56) References Cited

U.S. PATENT DOCUMENTS

| | | | | |
|---|---|---|---|---|
| 5,631,665 A | * | 5/1997 | Takizawa et al. | ............. 345/88 |
| 6,120,152 A |   | 9/2000 | Nakayama et al. | |
| 6,683,657 B1 | * | 1/2004 | Miyawaki | .................... 348/743 |
| 6,943,756 B1 | * | 9/2005 | Choi | ............................ 345/32 |

FOREIGN PATENT DOCUMENTS

| | | |
|---|---|---|
| JP | A-3-179886 | 8/1991 |
| JP | U 04-006037 | 1/1992 |
| JP | A 04-199123 | 7/1992 |
| JP | 405224155 | * 9/1993 |
| JP | A 05-333323 | 12/1993 |
| JP | A 07-123342 | 5/1995 |
| JP | A 08-095515 | 4/1996 |
| JP | A 09-105907 | 4/1997 |
| JP | 2001-228569 | 4/2001 |
| JP | A 2001-100689 | 4/2001 |
| JP | A 2001-100699 | 4/2001 |
| JP | A 2001-142048 | 5/2001 |
| JP | A 2001-264728 | 9/2001 |
| JP | A 2003-107422 | 4/2003 |

* cited by examiner

*Primary Examiner*—Regina Liang
(74) *Attorney, Agent, or Firm*—Oliff & Berridge, PLC

(57) ABSTRACT

A projection type display is provided that can change a quantity of light emitted to a light modulation device without changing the intensity of light emission from a lamp and exhibits superiority in an image expression and adaptability to an operational environment. This includes an illumination device, a liquid crystal light valve modulating light emitted from the illumination device and a projection lens projecting light modulated by the liquid crystal light valve. This illumination device is provided with a light source and a fly-eye lens, making illumination distribution of light incident from the light source uniform and a liquid crystal element for light adjustment, which is disposed on an optical axis of light emitted from the light source and adjusts a quantity of light emitted from the light source. Hence, a quantity of light per unit time emitted from the illumination device is adjustable by driving a liquid crystal element for light adjustment with the time-sharing based on information from outside.

12 Claims, 11 Drawing Sheets

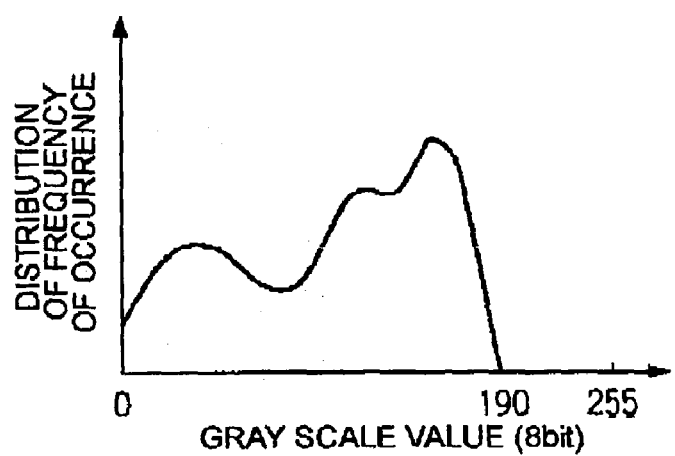
FIG. 3
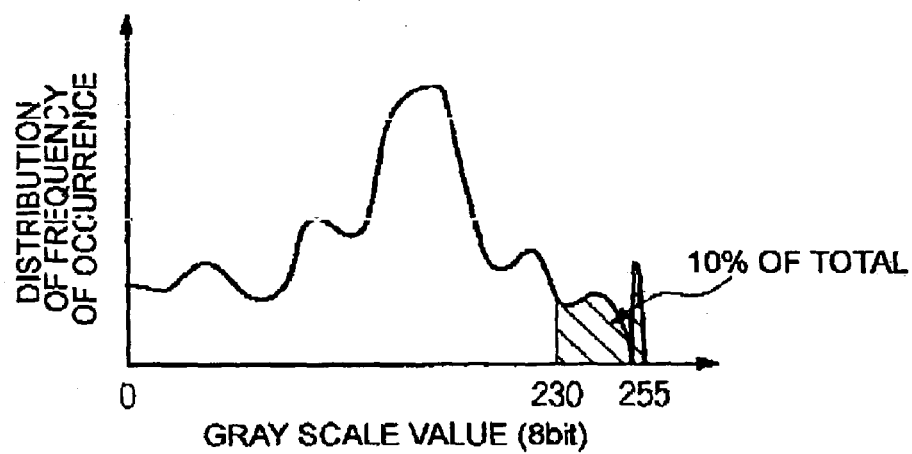
FIG. 4
FIG. 5

(a)

(b)

(a)

(b)

(c)

PROJECTION TYPE DISPLAY, A DISPLAY AND A DRIVE METHOD THEREOF

BACKGROUND OF THE INVENTION

1. Field of Invention

The present invention relates to a projection type display, a display and a drive method thereof. In particular, it relates to a projection type display, a display and its drive method, that are superior in an image expression and obtain an image of brightness fitted for a user's favorite and an operating environment.

2. Description of Related Art

The related art includes developments in information apparatuses. In the related art, there is an increasing demand for flat type displays with high resolution and low power consumption. Thus, the related art includes research and development of these features. In particular, a liquid crystal display is expected to satisfy the above-mentioned demand since its optical characteristic varies by electrically controlling an alignment of liquid crystal molecules. As one form of this liquid crystal display, a projection type liquid crystal display (liquid crystal projector) is well known. The display projects and enlarges an image emitted from optical system using a liquid crystal display light valve onto a screen via a projection lens.

A projection type liquid crystal display uses a liquid crystal light valve as a light modulation device. On the other hand, projection type displays in practical use include those using a digital mirror device (hereafter "DMD") as a light modulation device in addition to a liquid crystal light valve. However, this kind of a related art projection type display has the following problems.

(1) Sufficient contrast cannot be obtained because of light leakage and stray light among various kinds of optical elements constituting an optical system. Hence, the range of gray scale for displaying (the dynamic range) is narrow, and the related art projection type display is inferior to an existing monitor using a cathode ray tube (hereafter "CRT") in quality and strong appeal of an image.

(2) Even if improvement in quality of an image is intended by processing various kinds of image signals, sufficient effects are not exhibited because of the narrow dynamic range.

In order to address or solve such problems of a projection type display, namely in order to expand its dynamic range, it is considered that a flux of light incident on a light modulation device (a light valve) is changed in response to an image signal. The most convenient method to realize such change is to change the light-emitting intensity of a lamp. Japanese Patent Laid-Open No. 3-179886 discloses a method to control the light-emitting intensity of a metal halide lamp.

As a lamp used in a projection type liquid crystal display, a high-pressure mercury lamp is commonly used in the related art. However, it is extremely difficult to control the light-emitting intensity of a high-pressure mercury lamp. Hence, it is required to provide a method that changes a flux of light incident on a light modulation device in response to an image signal, even if the light-emitting intensity of a lamp itself is not changed.

In addition to the above-mentioned problems, the light-emitting intensity of a light source is fixed in related art projection type displays. Hence, it is a problem that, for example, a displayed image becomes too bright under a viewing environment that is relatively dark, and brightness of a displayed image changes in response to the size of a projection screen changed by zooming a projection lens and a projection distance.

In order to overcome the above mentioned problems, the object of the present invention is to provide a projection type display, a display and its driving method that can change a flux of light incident onto a light modulation device without changing the light-emitting intensity of a lamp and show superior effects in an image expression and adaptability to an operating environment.

SUMMARY OF THE INVENTION

In order to address the above-mentioned object, a projection type display of the present invention, as the first mode, includes: an illumination device; a light modulation device modulating light emitted from the illumination device; and a projecting device projecting light modulated by the light modulation device, the illumination device being provided with a light source, a uniform illumination device making distribution of illumination of light emitted from the light source uniform, and a liquid crystal element for light adjustment, installed on the optical axis of light emitted from the light source, adjusting the intensity of light emitted from the light source; and a flux of light emitted from the illumination device per unit time is adjustable by driving the liquid crystal element for light adjustment with time-sharing in response to information from outside.

The inventor found that a liquid crystal element for light adjustment, adjusting the transmittance ratio based on information from outside, is added to the related art illumination device of a projection type display to adjust a flux of light incident onto the light modulation device in response to an image, without changing light-emitting intensity of a light source. The above-mentioned "information from outside" is, for example, information based on an image signal applied to a light modulation device, information based on the rate of magnifying a projected image, information based on a state of brightness under operational environment, and/or information of user's taste.

According to the projection type display of the present invention, a liquid crystal element for light adjustment to control a flux of light emitted from a light source is provided, and this liquid crystal element for light adjustment is controlled based on the information from outside. Hence, a flux of light emitted from the illumination device to the light modulation device per unit time can be adjusted by function of the liquid crystal element for light adjustment when the projection type display is used. For example, if information from outside is based on an image signal, and the image at that time is a bright scene, the liquid crystal element for light adjustment is driven with time-sharing when receiving a voltage applied thereto. A flux of transmitting light per unit time is adjusted by the time allocation of this time-sharing drive such that a flux of light emitted from the illumination device to the light modulation device per unit time is adjusted.

For example, if the time allocation for applying voltage and for applying non-voltage during one frame of the liquid crystal element for light adjustment in a normally white display is controlled, it is possible to freely change this time allocation of two states such as 100% transmittance ratio and 0% transmittance ratio (hereafter referred to as "the time allocation for 100% transmittance ratio" and "for 0% transmittance ratio").

In addition, changing the time allocation for 100% transmittance ratio and for 0% transmittance ratio also changes a flux of light emitted from the liquid crystal element for light adjustment. Hence, in case of a bright scene, the time allocation for 100% transmittance ratio is increased and the time allocation for 0% transmittance ratio is decreased, so as to increase a flux of light. In case of a dark scene, the time allocation for 100% transmittance ratio is decreased and the time allocation for 0% transmittance ratio is increased, so as to decrease a flux of light. Thus, a flux of light emitted to the light modulation element can be adjusted by the liquid crystal element for light adjustment.

Therefore, the light modulation device can obtain light having the intensity according to an image, even when the light-emitting intensity from the light source is fixed, and the above-mentioned constitution can contribute to expansion of the dynamic range of the projection type display. Similarly, it is possible to obtain light having the intensity according to a magnifying rate of projection, brightness under an operational environment or a user's taste.

Therefore, according to the projection type display of the present invention, it is provided with the illumination device where a flux of light emitted from the uniform illumination device per unit time is adjustable by driving the liquid crystal element for light adjustment with time-sharing based on information from outside. Hence, light having desirable brightness can be obtained at the light modulation device even when light-emitting intensity of a light source is fixed. Thus, dynamic range of a projection type display can be expanded, and a projection type display, that is superior in an image expression and adaptability to an operating environment, can be realized.

When a flux of light is adjusted by the liquid crystal element for light adjustment, the white balance of light emitted from the liquid crystal element for light adjustment to the light modulation device, may be changed. Namely, light emitted from the liquid crystal element for light adjustment to the light modulation device, may be colored. This is because birefringence of liquid crystal is utilized in a liquid crystal element used as a light adjusting device. If light, emitted from the liquid crystal element for light adjustment to the light modulation device is colored, such coloration affects light emitted from the light modulation device such that an image obtained by projecting the light is also affected. Hence, according to the projection type display of the present invention, voltage applied to the light modulation device is changeable in response to a signal applied to the liquid crystal element for light adjustment, or period of applying voltage to the light modulation device is changeable in response to a signal applied to the liquid crystal element for light adjustment. Hence, it is possible thereby to correct color tone (white balance correction) by the light modulation device regarding light emitted from the liquid crystal element for light adjustment.

For example, when the transmittance ratio of the liquid crystal element for light adjustment is near 100% (more concretely, the transmittance ratio 98%) and the transmittance ratio is near 0% (more concretely, transmittance ratio 2%), a proportional formula can be easily calculated, showing the relationship between the transmittance ratio of the liquid crystal element for light adjustment and the white balance of light emitted from the liquid crystal element for light adjustment (the relationship between the time allocation for the transmittance ratio 100% and for the transmittance ratio 0% of the liquid crystal element for light adjustment and the white balance of light emitted from the liquid crystal element for light adjustment), from two points showing the white balance of light emitted from the liquid crystal element for light adjustment. Then, such a proportional formula is memorized in advance in a control circuit, and voltage applied to the light modulation device is corrected by simple calculation, or a period of supplying voltage to the light modulation device is corrected by simple calculation such that light emitted from the liquid crystal element for light adjustment becomes the desired white balance. Hence, it is possible to emit light in which the color tone is corrected by the light modulation device, for example, light under the condition of the desired white balance. Thus, light emitted from the light modulation device can be prevented from being affected by coloration of light emitted from the liquid crystal element for light adjustment.

The relationship, between the transmittance ratio of the liquid crystal element for light adjustment (a flux of light emitted from the liquid crystal element for light adjustment) and the white balance of light emitted from the liquid crystal element for light adjustment, is linear. Therefore, the white balance is corrected only by operating simple calculation to signals applied to the light modulation device based on signal applied to the liquid crystal element for light adjustment. Thus, color tone can be easily corrected, and the size of a control circuit can be small.

Therefore, according to the projection type display of the present invention, a flux of light emitted from the uniform illumination device can be adjusted by driving the liquid crystal element for light adjustment with time-sharing based on information from outside. Further, it is possible to correct color tone by changing signals applied to the above light modulation device based on signals applied to the liquid crystal element for light adjustment. Hence, even when the light-emitting intensity of the light source is fixed, light having desired brightness and corrected white balance can be obtained at the light modulation device such that the dynamic range of a projection type display can be expanded, and a projection type display device that is superior in an image expression and adaptability to operating environment can be realized.

In an exemplary embodiment of a liquid crystal element for light adjustment according to the present invention, a liquid crystal panel is preferably used, where a liquid crystal layer is sandwiched between a pair of light-transmissive substrates, light-transmissive electrodes are formed on the liquid crystal layer side of the pair of light-transmissive substrates and an orientation film is formed at the liquid crystal layer side on these light-transmissive electrodes. It is preferable that a rapid response system such as a FLC (a ferroelectric liquid crystal) system, an AFLC (antiferroelectric liquid crystal) system, a π-cell system, or a TN (Twisted Nematic) system are used, as this liquid crystal panel.

In an exemplary embodiment of a uniform illumination device according to the present invention, the structure may be such that two fly-eye lenses include a first fly-eye lens and second fly-eye lens that are arranged in order from the side closest to the light source along with the above optical axis. Thus, in the uniform illumination device including two fly-eye lenses, plural images of the second light source are formed by a first fly-eye lens. These plural images of the second light source are superimposed on a light adjustment element via the second fly-eye lens. Hence, distribution of illumination of the original light source can be uniform.

In addition, in another exemplary embodiment of the uniform illumination device, there may be provided a rod type light guide member that emits bundles of light rays by divining a bundle of light from the light source into plural bundles of light rays. According to another exemplary embodiment a rod type light guide member, a rod lens and so on can be used. Thus, if a uniform illumination device is a rod type light guide member, it is possible to control not only a flux of light that irradiates the entire surface to be irradiated of the light modulation device, but also a flux of light that irradiates each area when the entire region to be irradiated in the light modulation device, is divided into plural areas. According to this embodiment, it is possible to control an illumination distribution within such area in the light modulation device.

Next, a display of the present invention includes an illumination device and a light modulation device modulating light emitted from the illumination device, wherein the illumination device being provided with a light source, a uniform illumination device making distribution of illumination of light emitted from the light source uniform, and a liquid crystal element for light adjustment, installed on an optical axis of light emitted from the light source, adjusting the intensity of light emitted from the light source; and a flux of light emitted from the uniform illumination device per unit time is adjustable by driving the liquid crystal element for light adjustment with time-sharing in response to information from outside.

According to this display, the illumination device can adjust a flux of light emitted from the uniform illumination device per unit time by controlling a flux of light transmitting through the liquid crystal element for light adjustment with time-sharing drive based on information from outside. Hence, the desired brightness of light can be obtained at the light modulation device, even when light-emitting intensity is fixed, such that the dynamic range of a projection type display can be expanded. Thus a projection type display, superior in an image expression and adaptability to an operating environment, can be realized.

In addition, in an exemplary embodiment the light modulation device can correct color tone by changing signals applied to the light modulation device based on signals applied to the liquid crystal element for light adjustment. In addition, in an exemplary embodiment, in the above light modulation device, the period of applying voltage to the light modulation device is changed based on a signal supplied to the liquid crystal element for light adjustment, such that color tone of light emitted from the liquid crystal element for light adjustment is correctable by the light modulation device.

In addition, to drive the above projection type display or display, an exemplary embodiment provides a control signal determination device determining a control signal, to control the liquid crystal element for light adjustment, based on an image signal; and a light adjustment control device controlling the liquid crystal element for light adjustment based on the control signal.

According to this structure, a control signal determination device determines a brightness control signal for controlling the liquid crystal element for light adjustment based on an image signal. The light adjustment control device controls the time allocation for the light transmittance ratio 100% and for the transmittance ratio 0% in 1 frame in the liquid crystal element for light adjustment based on the above control signal. A flux of light per 1 frame is controlled by this operation. As a result, the dynamic range of a projection type display or a display can be expanded, and a projection type display or a display superior in an image expression and adaptability to an operating environment can be realized.

In addition, in the above projection type display or display, according to an exemplary embodiment, it is preferable to provide a light modulation control signal determination device, as a control device, determining a control signal to control the light modulation device based on the control signal controlling the liquid crystal element for light adjustment; and a light modulation control device controlling the light modulation device based on the control signal determined by the light modulation control signal determination device.

The light modulation control signal determination device memorizes a proportional formula, in advance, showing the relationship between the transmittance ratio of the liquid crystal element for light adjustment (or a flux of light emitted from the liquid crystal element for light adjustment) and the white balance of light emitted from the liquid crystal element for light adjustment (the proportional formula showing the relationship between the time allocation for the transmittance ratio 100% and for the transmittance ratio 0% of the liquid crystal element for light adjustment and the white balance of light emitted from the liquid crystal element for light adjustment). The light modulation control signal determination device determines a signal applied to the light modulation device by simple calculation such that light emitted from the liquid crystal element for light adjustment to the light modulation device becomes desired white balance in the light modulation device. This determined signal is applied to the light modulation device from the light modulation control device based on the signal determined by the light modulation control signal determination device. This operation can correct color tone of light emitted from the liquid crystal element for light adjustment to the light modulation device.

In addition, an exemplary method of driving the above projection type display or a display, determines a control signal to control the liquid crystal element for light adjustment based on an image signal and controls the liquid crystal element for light adjustment based on the control signal, such that a flux of light irradiated to the light modulation device is adjusted.

According to this structure, the dynamic range of a projection type display or a display can be expanded, and an image having a high image expression can be obtained.

Further, in an exemplary method of driving the above projection type display or a display, it is preferable to determine a control signal to control the light modulation device based on the control signal to control the liquid crystal element for light adjustment and control the light modulation device based on the control signal such that color tone of light is corrected. According to this method, color tone of light emitted from the liquid crystal element for light adjustment to the light modulation device can be corrected such that change of the white balance by coloration of light emitted from the liquid crystal element for light adjustment can be avoided.

Next, in order to address the above issue, a projection type display of the present invention, as the second mode, includes a light source; a color separation device separating light emitted from the light source into plural color lights; plural light modulation device modulating plural color lights separated by the color separation device, a color integration device integrating color lights modulated by the plural light modulation device; and a projecting device projecting light integrated by the color integration device, wherein; a first light adjustment device adjusting a flux of the color light is installed between the light adjustment device and the color separation device along an optical path of at least one separated color light, and the first light adjustment device is controlled based on information from outside such that a flux of color light transmitting through the first light adjustment device is adjustable.

The inventor found an additional way to adjust a flux of light incident onto the light modulation device in response to an image without changing light-emitting intensity of a light source, where a flux of at least one color light among plural color lights obtained by separating light emitted from the light source by the color separation device, can be adjusted based on information from outside. The above-mentioned "information from outside" is, for example, information based on an image signal applied to a light modulation device, information based on the rate of magnifying a projected image, information based on a state of brightness under operational environment and information of user's taste.

Namely, according to a projection type display of an exemplary embodiment, the first light adjustment device for controlling a flux of light is installed between the light modulation device and the color separation device on the optical path of at least one separated color light. This first light adjustment device is controlled based on the above mentioned information from outside. In other words, the first light adjustment device adjusting a flux of at least one color light among plural color lights separated by the color separation device is provided between at least one of, plural light modulation devices and the color separation device, such that the first light adjustment device is controlled based on information from outside. Hence, for example, when information from outside is information based on an image signal, and an image scene at that time has deviated color tone, the light transmittance of color light transmitting through the first light adjustment device is adjusted by controlling the first light adjustment device such that it is possible to adjust a flux of light, incident on the light modulating device, corresponding to the first light adjustment device. In this way, at least one of the plural light modulation device can obtain a flux of light in response to an image, even when the light-emitting intensity of the light source is fixed, such that the dynamic range of the projection type display can be expanded.

Therefore, according to the projection type display of the above exemplary embodiment, a flux of at least one color light among plural color lights, obtained by separating the light emitted from the light source using the color separation device, can be adjusted by controlling the first light adjustment device based on the information from outside. Hence, even when the light-emitting intensity of the light source is fixed, the desired intensity of color light can be obtained at the light modulation device corresponding to the first light adjustment device such that the dynamic range of a projection type display can be expanded, and a projection type display superior in an image expression and adaptability to an operational environment can be realized.

In addition, in the projection type display of the second exemplary embodiment, a second light adjustment device adjusting a flux of light emitted from the light source may be installed between the light source and the color separation device; and the second light adjustment device may be controlled based on information from outside such that a flux of light emitted from the light source transmitting through the second light adjustment device is adjustable (this may be referred to as third mode of the projection type display).

According to the structure provided with the above mentioned second light adjustment device installed between the light source and the color separation device, a flux of light emitted from the light source can be adjusted in advance by the second light adjustment device based on the information from outside before color separation. Then, a flux of at least one of color lights among plural color lights after color separation can be adjusted by the first light adjustment device, thereafter.

In addition, in the second exemplary embodiment of the projection type display, it is preferable that the plural color lights, separated by the color separation device are red light, green light and blue light; the plural light modulation device includes a red light modulation device for modulating the red light, a green light modulation device for modulating the green light and a blue light modulation device for modulating the blue light; the first light adjustment device is installed between the plural light modulation device and the color separation device; and the first light adjustment device is controlled based on information from outside such that a flux of light transmitting through the first light adjustment device is adjustable.

According to the structure of this projection type display, the first light adjustment device is provided between the plural light modulation device and the color separation device. The first light adjustment device is provided on each of the optical axes of plural separated color lights between the light modulation device and the color light separation device, such that it is possible to adjust a flux of any color light, such as red light, green light and blue light obtained by color separation of light emitted from the light source. Hence, even when the light-emitting intensity of the light source is fixed, a desirable flux of light can be obtained at the light modulation device corresponding to each of the first light adjustment device. Therefore, brightness corresponding to an image can be obtained. Further, even when color tone of an image is deviated, it is possible to adjust light effectively. Thus, the dynamic range of the projection type display can be expanded, and it is advantageous in that the projection type display superior in an image expression and adaptability to an operational environment can be realized.

In addition, when the first light adjustment device is provided between the plural light modulation device and the color separation device, a flux of each of the plural color lights can be adjusted by controlling each of the first light adjustment devices, such that it is possible to adjust the white balance of light obtained by integrating color lights emitted from each of the light modulation device.

Thus, when the first light adjustment device is provided between the plural light modulation device and the color separation device, the intensity of color light emitted to each of the light modulation devices can be adjusted by controlling each of the first light adjustment devices, such that it is not necessary to install the second light adjustment device before color separation.

In addition, in the third exemplary embodiment of a projection type display, it is preferable that the plural color lights separated by the color separation device are red light, green light and blue light. The plural light modulation device includes a red light modulation device for modulating the red light, a green light modulation device for modulating the green light and a blue light modulation device for modulating the blue light. The first light adjustment device is installed between the green light modulation device and the color separation device along a green light path; and the first light adjustment device is controlled based on information from outside such that a flux of green light transmitting through the first light adjustment device is adjustable.

According to this projection type display, a flux of light emitted from the light source can be adjusted in advance, before the color separation by the second light adjustment device, based on the information from outside. Then, a flux of green light, among plural color lights after color separation, can be adjusted by the first light adjustment device thereafter. Hence, for example, in case of an image such as evening scenery or blue sky, a flux of green light can be decreased by controlling the first light adjustment device such that gray scale displaying green color can be finely managed, and gray scale reproduction of green color can be improved.

Green light has high visual sensitivity for a viewer such that an image seems to be dark if the green color light is weak, even when red or blue light is strong. In an image such as evening scenery, it is necessary that red light is emitted strongly, and when a light adjustment device is installed before color separation, a flux of light can not be decreased whereas an image looks dark. As a result, green tone reproduction becomes worse, and good image display is not provided. On the other hand, according to the above mentioned projection type display, a flux of green light, among plural color lights after the color separation, can be adjusted by the first light adjustment device such that desirable image reproduction can be attained effectively, even if color tone of image is deviated like a blue sky or evening scenery.

In addition, in the third exemplary embodiment of the projection type display, it is preferable that the plural color lights separated by the color separation device are red light, green light and blue light. The plural light modulation device includes a red light modulation device for modulating the red light, a green light modulation device for modulating the green light and a blue light modulation device for modulating the blue light. The first light adjustment device is installed between the blue light modulation device and the color separation device along a blue light path; and the first light adjustment device is controlled based on information from outside, such that a flux of blue light transmitting through the first light adjustment device is adjustable.

According to the projection type display, a flux of light emitted from the light source can be adjusted in advance by the second light adjustment device based on the information from outside before color separation. Then, a flux of blue light, among plural color lights after color separation, can be adjusted by the first light adjustment device thereafter. Hence, for example, in case of an image of evening scenery, a flux of blue light is decreased by controlling the first light adjustment device such that the ratio of red light in an image can be increased. Therefore, according to the above mentioned projection type display, a flux of blue light, among plural color lights after color separation, can be adjusted by the first light adjustment device such that desirable image reproduction can be attained effectively, even if color tone of image is deviated like evening scenery.

Further, when the first light adjustment device, adjusting the intensity of blue light is installed between the above color separation device and the blue light modulation device, a flux of blue light incident on the light modulation device for blue light can be decreased in case of an image having a small flux of blue light. Hence, even when the light modulation device for blue light includes a liquid crystal display described thereafter, deterioration of a liquid crystal display due to the blue light can be avoided, and light-proof property of a liquid crystal display can be improved as the light modulation device for blue light.

In addition, in the third exemplary embodiment of the projection type display, it is preferable that the plural color lights separated by the color separation device are red light, green light and blue light. The plural light modulation device includes a red light modulation device for modulating the red light, a green light modulation device for modulating the green light and a blue light modulation device for modulating the blue light. Each of the first light adjustment devices are installed between the green light modulation device and the color separation device along a green light path; and/or between the blue light modulation device and the color separation device along a blue light path. These first light adjustment devices are controlled based on information from outside, such that a flux of the blue light and the green light transmitting through the first light adjustment device is adjustable.

According to this projection type display, it has similar effects as those of a display provided with the first light adjustment device adjusting a flux of blue light or the first light adjustment device adjusting the intensity of green light described before.

In addition, a projection type display of the present invention, as the fourth mode, includes a light source; a color separation device separating light emitted from the light source into plural color lights sequentially; a light modulation device modulating each of plural color lights separated by the color modulation device; and a projecting device projecting each of the color lights modulated by the color modulation device sequentially. A first light adjustment device, adjusting a flux of each of the color lights synchronously with emitting each of the color lights from the color separation device, is installed between the light modulation device and the color separation device. The first light adjustment device is controlled based on information from outside such that a flux of light transmitting through the first light adjustment device is adjustable.

According to the projection type display of the fourth exemplary embodiment, a flux of each color light, separated from light of the light source by the color separation device, can be adjusted by controlling the first light adjustment device. Hence, even when light-emitting intensity of the light source is fixed, a desirable amount of color light can be obtained by the light modulation device, such that the dynamic range of the projection type display can be expanded, and a projection type display, superior in an image expression and adaptability to an operational environment, can be realized.

In addition, a projection type display of the present invention, as the fifth exemplary embodiment, includes a light source; a color separation device separating light emitted from the light source into plural color lights sequentially; a light modulation device modulating each of plural color lights separated by the color modulation device; and a projecting device projecting sequentially each of the color lights modulated by the light modulation device.

A second light adjustment device, adjusting a flux of light emitted from the light source synchronously with emitting each of the color lights from the color separation device, is installed between the light source and the color separation device. The second light adjustment device is controlled based on information from outside such that a flux of light emitted from the light source and transmitting through the second light adjustment device is adjustable.

According to this projection type display, a flux of light emitted from the light source can be adjusted before the color separation by controlling the second light adjustment device based on information from outside. A flux of each of the color lights obtained by transmitting such adjusted light through color separation devices is adjusted such that a desired flux of light can be obtained, even when the light-emitting intensity of the light source is fixed. Hence, the dynamic range of the projection type display can be expanded, and the projection type display superior in an image expression and adaptability to an operational environment can be realized.

In addition, a projection type display of the present invention, as the sixth exemplary embodiment, includes plural light sources capable of emitting different color lights, respectively; plural light modulation devices modulating the color lights corresponding to the plural light sources, respectively; a color integration device integrating color lights modulated by the plural modulation devices; and a projecting device projecting light integrated by the color integration device.

A first light adjustment device adjusting the intensity of the color light is installed between the light source and the color modulation device along an optical path of at least one of the different color lights; and the first light adjustment device is controlled based on information from outside such that a flux of light transmitting through the first light adjustment device is adjustable.

According to this projection type display, a flux of at least one of the plural color lights emitted from the plural light sources can be adjusted by controlling the first light adjustment device based on the information from outside. A desired flux of light can be obtained at the light modulation device corresponding to the first light adjustment device such that the dynamic range of the projection type display can be expanded, and the projection type display superior in an image expression and adaptability to an operational environment can be realized.

In addition, in the projection type display of the sixth exemplary embodiment, it is preferable that the different color lights, separated by the color separation device, are red light, green light and blue light. The plural light modulation devices include a red light modulation device for modulating the red light, a green light modulation device for modulating the green light and a blue light modulation device for modulating the blue light. The first light adjustment device is installed between the plural light sources and the plural light modulation devices. The first light adjustment device is controlled based on information from outside, such that a flux of the color light transmitting through the first light adjustment device is adjustable.

According to this projection type display, the first light adjustment device is provided between the plural light sources and the plural light modulation devices. Namely, the first light adjustment device is provided on the light path for each of the plural color lights between the light source and the light modulation device, such that it is possible to adjust a flux of color lights such as red light, green light and blue light emitted from the plural light sources. Even when the light-emitting intensity of each of the light sources is fixed, a desired amount of color lights can be obtained by the light modulation device corresponding to the first light adjustment device, such that brightness in response to an image can be obtained, and light adjustment is effectively attained even when color tone of an image is deviated. Hence, the dynamic range of the projection type display can be expanded, and it is advantageous in realizing the projection type display superior in an image expression and adaptability to an operational environment.

In addition, the projection type display of the present invention, as the seventh exemplary embodiment, includes a light source capable of emitting each of different color lights sequentially; a light modulation device modulating each of the color lights; and a projecting device projecting each of the color lights modulated by the modulation device.

A first light adjustment device capable of adjusting a flux of the color light synchronously with emitting each of the color lights from the light source is provided. The first light adjustment device is controlled based on information from outside such that a flux of light transmitting through the first light adjustment device is adjustable.

According to this projection type display, a flux of each of the color lights emitted from the light source can be adjusted by controlling the first light adjustment device based on the information from outside, such that a desired flux of light can be obtained at the light modulation device even when the light-emitting intensity of color lights emitted from the light source is fixed. Hence, the dynamic range of a projection type display can be expanded, and a projection type display superior in an image expression and adaptability to an operational environment can be realized.

In the above projection type display, at least one of the first light adjustment devices may be a liquid crystal element for light adjustment. In such first light adjustment device, including a liquid crystal element for light adjustment, when voltage is applied to this liquid crystal element for light adjustment, for example, the applied voltage is increased, so that the transmittance ratio of color light transmitting through the first light adjustment device becomes lower. Further, when the applied voltage is decreased, the transmittance ratio of color light transmitting through the first light adjustment device becomes higher. Thus, the intensity of color light can be adjusted.

In the projection type display, at least one of the first light adjustment device may be a shutter of a roll screen system or a disk rotary system. In such first light adjustment device, including a shutter of the roll screen system or the disk rotary system, color light transmitting through this first light adjustment device can be shielded during a specific term. A flux of color light transmitting through this first light adjustment device can be adjusted by changing this shielding term.

In the above projection type display, at least one of the second light adjustment devices may be a liquid crystal element for light adjustment. In such second light adjustment devices, including a liquid crystal element for light adjustment, when voltage is applied to this liquid crystal element for light adjustment, for example, the applied voltage is increased, so that the transmittance ratio of color light transmitting through the second light adjustment device becomes lower. Further, when the applied voltage is decreased, the transmittance ratio of color light transmitting through the second light adjustment device becomes higher. Thus, the intensity of light emitted from the light source can be adjusted before color separation.

In the projection type display, at least one of the second light adjustment devices may be a shutter of a roll screen system or a disk rotary system. In such a second light adjustment device, including a shutter of the roll screen system or the disk rotary system, color light transmitting through this second light adjustment device can be shielded during a specific term. A flux of color light transmitting through this second light adjustment device can be adjusted by changing this shielding term.

As an exemplary embodiment of a liquid crystal element for light adjustment used as the first and the second light adjustment devices, it is preferable to provide a liquid crystal panel where a liquid crystal layer is sandwiched between a pair of light-transmissive substrates, light-transmissive electrodes are formed on the pair of light-transmissive substrates at the side of liquid crystal layer, and an orientation layer is formed on each of the light transmissive-electrodes at the side of a liquid crystal layer. As this liquid crystal panel, TN (Twisted Nematic) system, STN (Super Twisted Nematic) system, VA (Vertical Alignment), πcell system, IPS (In-Plane Switching) system, FLC (a ferroelectric liquid crystal) system, AFLC (antiferroelectric liquid crystal) system can be used.

In addition, a method of driving a projection type display preferably includes a control signal determination device controlling the first light adjustment device and/or the second light adjustment device based on the image signal, and a light adjustment control device controlling the first light adjustment device and/or the second light adjustment device based on the control signal.

According to this structure, a control signal for controlling the above first light adjustment device and/or the second light adjustment device is determined by the control signal determination device based on histogram of every color of image signal. Then, the light adjustment control device supplies light, of which brightness is changed in response to an image, to the light modulation device by controlling the first light adjustment device and/or the second light adjustment device based on these control signals.

Hence, this operation allows the dynamic range of a projection type display to be expanded, and a projection type display superior in an image expression and adaptability to an operational environment can be realized.

A method of driving a projection type display of the present invention is a method of driving any one of the above structures of projection type displays, determines a control signal to control the first light adjustment device and/or the second light adjustment device based on the image signal, and controls the first light adjustment device and/or the second light adjustment device based on the control signal such that a flux of light incident onto the light modulation device is adjusted.

According to this structure, dynamic range of the projection type display can be expanded, and a display superior in an image expression can be obtained.

BRIEF DESCRIPTION OF THE DRAWINGS

FIG. 3 shows a schematic explaining a first method to determine a brightness control signal from an image signal in the projection type liquid crystal display of the first exemplary embodiment.

FIG. 4 shows a schematic explaining a second method of the first exemplary embodiment.

FIG. 5 shows a schematic explaining a third method of the first exemplary embodiment.

DETAILED DESCRIPTION OF PREFERRED EMBODIMENTS

A Projection Type Display

FIG. 1 through FIG. 6 illustrate a projection type liquid crystal display of the first exemplary embodiment as one example of the projection type display of the present invention.

Figure 1:
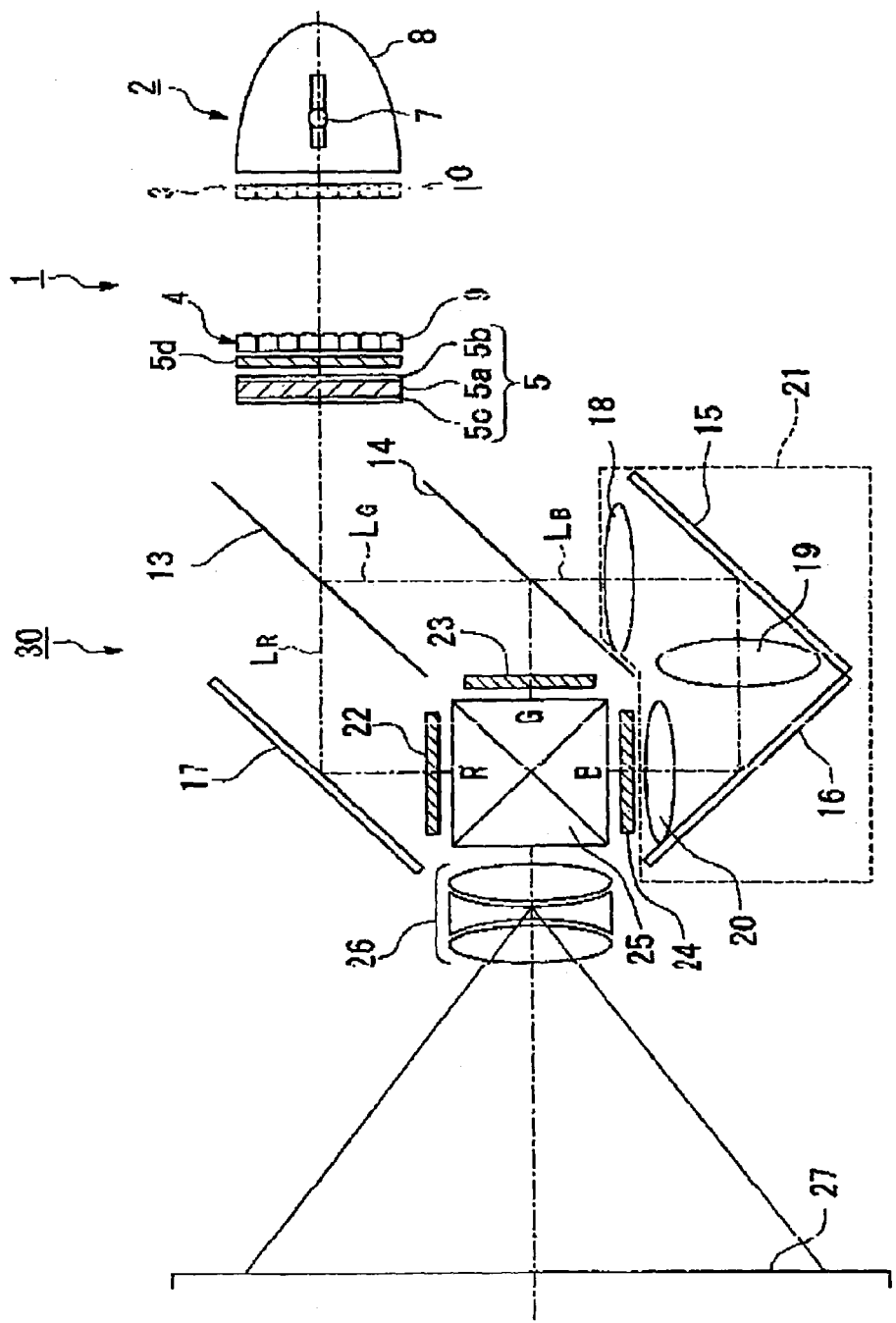
FIG. 1 is a schematic showing a projection type liquid crystal display of the first exemplary embodiment of the present invention.

A projection type liquid crystal display of the exemplary embodiment is a projection type color liquid crystal display of three plates system provided with a transmissive type liquid crystal light valve for each of the colors such as R (red), G (green), and B (blue). FIG. 1 is a schematic showing this projection type liquid crystal display. The figure shows, using reference numbers, an illumination device 1, a light source 2, fly-eye lenses 3 and 4 (uniform illumination device), a polarized light converter 5d, a liquid crystal element for light adjustment 5, dichroic mirrors 13 and 14, reflection mirrors 15, 16, and 17, liquid crystal light valves 22, 23, and 24 (light modulation device), a cross dichroic prism 25, and a projection lens 26 (a projection device).

The illumination device 1 in the present exemplary embodiment includes the light source 2, the fly-eye lens 3 and 4, the polarized light converter 5d and the liquid crystal element for light adjustment 5. The light source 2 includes a lamp 7, such as a high pressure mercury lamp and a reflector 8 to reflect light of the lamp 7. In addition, as a uniform illumination device to make illumination distribution of light from the light source uniform at the liquid crystal light valves 22, 23, and 24 to be illuminated, the first fly-eye lens 3 and the second fly-eye lens 4 are installed in order from the light source 2 side. Each of the fly-eye lenses 3 and 4 include plural optical lenses 9 and 10 (6×8 pieces of lenses in this exemplary embodiment, for example) and function as a uniform illumination device to make illumination distribution of light emitted from the light source 2 uniform at the liquid crystal light valves to be illuminated. The uniform illumination device emits light to the liquid crystal element for light adjustment 5 via the polarized light converter 5d. In the present exemplary embodiment, the liquid crystal element for light adjustment 5 is installed as a light adjustment device for adjusting a flux of light emitted from the light source 2.

The polarized light converter 5d includes a polarization beam splitter array (PBS array) installed at the uniform illumination device side and a ½ wave length plate array installed at the side of the liquid crystal element for light adjustment 5. This polarized light converter 5d is installed between the uniform illumination device and the liquid crystal element for light adjustment 5.

The liquid crystal element for light adjustment 5 includes a liquid crystal display panel 5a, including a liquid crystal display layer sandwiched between a pair of glass substrates (light-transmissive substrates), a light-transmissive electrode formed on each of the pair of glass substrates on the side of the liquid crystal layer and an orientation layer on the light-transmissive electrode at the side of the liquid crystal layer and polarizers 5b and 5c installed at the both sides of the liquid crystal panel 5a. As liquid crystal sandwiched between the pair of glass substrates, a material having high response speed such as the above FLC is used.

It is desirable that of the polarizers 5b and 5c, the polarizer 5c installed at least at the light-emitting side has light-proof property. The polarizer 5c having such a light-proof property is preferably a structural birefringence type, where plural aluminum ribs are arranged as stripes at the light incident side with a pitch smaller than the wavelength of light incident onto the liquid crystal layer. The polarizer 5c having plural light reflection bodies, can transmit a specific polarized light and reflect other specific polarized light.

The above liquid crystal element for light adjustment 5 is installed between the above uniform illumination device and the dichroic mirror 13 described after.

When applying voltage to the light-tranmissive electrodes in response to a drive signal received from the light adjustment element driver 34 to be described later, the liquid crystal element for light adjustment 5 can freely change the time allocation for the transmittance ratio 100% and for the transmittance ratio 0% by changing the time allocation for applying voltage and for applying no voltage during 1 frame term. In addition, changing the time allocation for the transmittance ratio 100% and for the transmittance ratio 0% modifies a flux of light emitted from the liquid crystal element for light adjustment 5 during 1 frame. Hence, in case of a bright image scene, a flux of light during 1 frame is increased by increasing time allocation for the transmittance ratio 100% and decreasing time allocation for the transmittance ratio 0% during 1 frame. In case of a dark image scene, a flux of light is decreased by decreasing time allocation for the transmittance ratio 100% and increasing time allocation for the transmittance ratio 0% during 1 frame. Thus, a flux of light emitted from the illumination device 1 during 1 frame (a flux of light emitted from the illumination device 1 during 1 frame) can be adjusted by the liquid crystal element for light adjustment 5.

Concrete examples of the time allocation for the light transmittance ratio 100% and for the light transmittance ratio 0%, for example, include a method of allocating ½ frame for each of the light transmittance ratio 100% and the light transmittance ratio 0% when obtaining a flux of light at the light transmittance ratio 50%, as shown in FIG. 6(a). The concrete examples moreover include a method of allocating ¼ frame for each of the light transmittance ratio 100% and the light transmittance ratio 0% and repeating such allocation twice in an alternate manner, as shown in FIG. 6(b). In case of the time allocation shown in FIG. 6(a), it is advantageous in that rising time and time for a residual image in the former half term are not displayed, and a smooth and high quality moving image can be displayed since the transmittance ratio is 0% in the former half part of 1 frame of an image and the transmittance ratio is 100% in the latter half part of it. In case that the time allocation for the transmission ratio 100% and for the transmittance ratio 0% is shortened and alternately repeated as shown in FIG. 6(b), it is advantageous in that flickering can be reduced compared with the longer time allocation for the transmittance ratio 100% and for the transmittance ratio 0%.

The latter stage of a structure of the illumination device 1 is explained along with function of each of structural elements as follows.

A dichroic mirror 13 for reflecting a blue light and a green light transmits a red light LR among light flux from the light source 2 and reflects a blue light LB and a green light LG. The red light LR transmitted through the dichroic mirror 13 is reflected with the reflection mirror 17 and incident onto a liquid crystal light valve for red light 22. On the other hand, among color lights reflected with the dichroic mirror 13, the green light LG is reflected with the dichroic mirror 14 for green light reflection and is incident onto a liquid crystal light valve for green light valve 23. On the other hand, the blue light LB also transmits through the dichroic mirror 14 and passes through a relay system 21 including a relay lens 18, a reflection mirror 15, a relay lens 19, a reflection mirror 16, and a relay lens 20 and is incident onto a liquid crystal light valve for blue light 24.

Each of these liquid crystal light valves 22, 23, and 24 is provided with a structure where color tone of light emitted from the liquid crystal element for light adjustment 5 to each of these liquid crystal light valves 22, 23, and 24 is corrected, (white balance correction) by changing voltage applied to these liquid crystal light valves based on a signal applied to the liquid crystal element for light adjustment 5. For example, when a light obtained by a certain time allocation for the transmission ratio 100% and for the transmission ratio 0% in the liquid crystal element for light adjustment 5 during 1 frame (which means a certain transmittance ratio of the liquid crystal element for light adjustment 5) is colored with yellow, white balance can be corrected by increasing voltage applied to the liquid crystal light valves for green light 23 and red light 22. When a light obtained by changing the time allocation for the transmission ratio 100% and for the transmission ratio 0% in the liquid crystal element for light adjustment 5 during 1 frame from the above case (which means changing the transmittance ratio of the liquid crystal element for light adjustment 5 or a flux of light from the above case) is colored with blue, white balance can be corrected by increasing voltage applied to the liquid crystal light valve for blue light 24.

Three colored lights modulated by each of liquid crystal display light valves 22, 23, and 24 are incident onto the cross dychroic prism 25. This prism includes four rectangular prisms attached together, and a dielectric multilayer film reflecting the red light and another dielectric multilayer film reflecting blue light arranged in a cross state inside of these prisms. These dielectric multilayer films integrate three color lights so as to form a light showing a color image. This integrated light is projected onto a screen 27 via a projection lens 26 within a projection optical system so as to display an enlarged image.

Next explained is a driving method of the projection type liquid crystal display 30 of the present exemplary embodiment.

Figure 2:
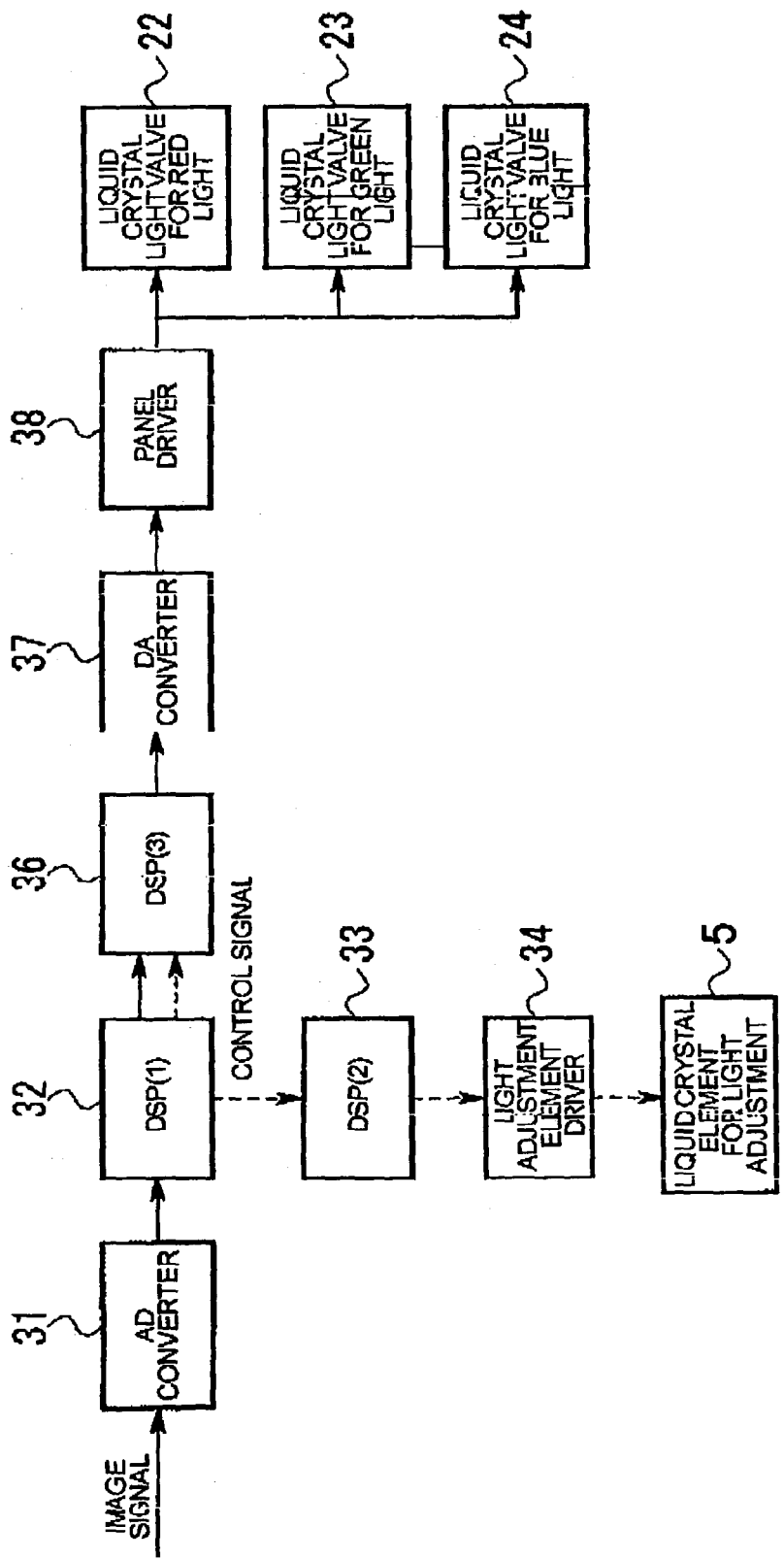
FIG. 2 is a block schematic showing a drive circuit of the projection type liquid crystal display of the first exemplary embodiment.
Figure 6:
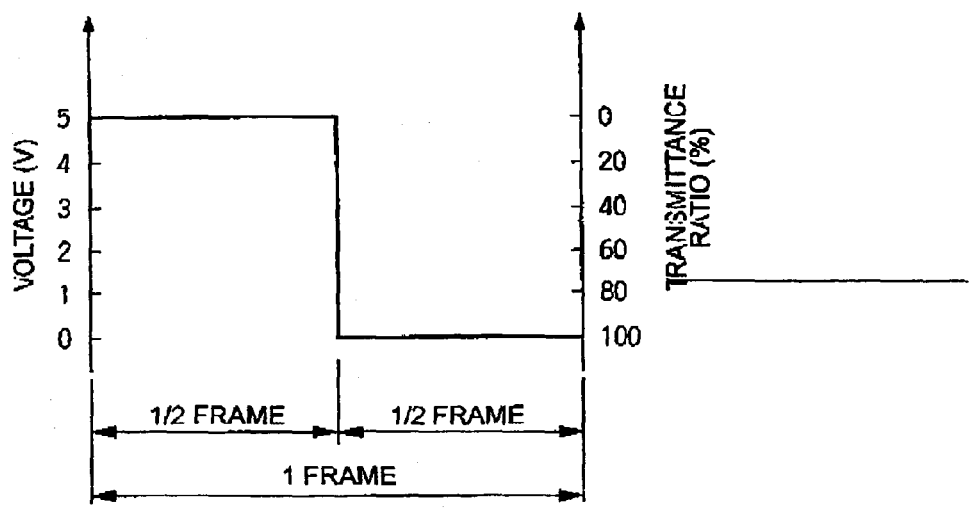
FIGS. 6(a) and 6(b) are schematics showing an example of the time allocation of transmission ratio; 100% and transmission ratio; 0% when driving a liquid crystal display element for light adjustment with time-sharing in the projection type display of an exemplary embodiment of the present invention.
Figure 6:
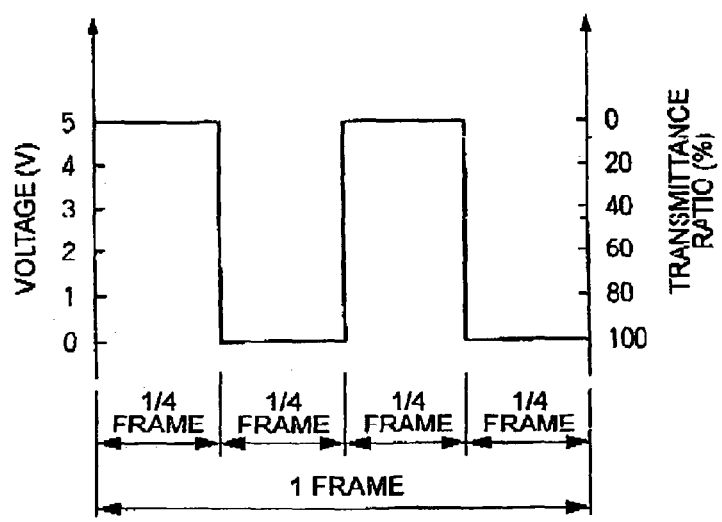

FIG. 2 is a block diagram showing a structure of a drive circuit for the projection type liquid crystal display 30 of the present exemplary embodiment. In case of the related art projection type liquid crystal display without a light adjustment function, an inputted image signal is supplied directly to a liquid crystal panel driver after being appropriately corrected. On the other hand, in the present exemplary embodiment, which includes a light adjustment function and a color correction function and controls them based on an image signal, digital signal processing blocks of circuits DSP (1) . . . DSP (3) are necessary as a basic structure and explained below.

In the present exemplary embodiment, as shown in FIG. 2, an image signal, inputted as an analog signal, is applied to a DSP (1) 32 that is the first digital signal processing circuitry (a control signal determination means) through an AD converter 31. The DSP (1) 32 determines a bright control signal, which decides the time allocation for the transmittance ratio 100% and for the transmittance ratio 0% during 1 frame when the liquid crystal display element for light adjustment 5 is driven with time-sharing from an image signal, namely the light transmittance ratio of the liquid crystal element for light adjustment (a flux of light transmitting through the liquid crystal element for light adjustment).

The DSP (2) 33 (light adjustment control means) controls the light adjustment element driver 34 based on the bright control signal such that this driver 34 drives the liquid crystal element for light adjustment 5 actually with time-sharing as the final stage. Here, the time allocation for time-sharing is shown, for example, in FIG. 6(a) or FIG. 6(b).

On the other hand, the brightness control signal determined by the DSP (1) 32 is also inputted to the DSP (3) 36 (a light modulation signal decision device and an light modulation control device) along with an image signal.

After the image signal inputted to the DSP (3) 36 is converted to an analog signal again by a DA converter 37, this analog image signal is inputted to the panel driver 38 and is supplied to the liquid crystal light valve 22 for the red light (the R panel in FIG. 2), the liquid crystal light valve for the green light 23 (the G panel), and the liquid crystal light valve for blue light 24 (the B panel) from the panel driver 38 respectively.

In addition, this DSP (3) 36 memorizes a proportional formula beforehand, showing the relationship between the transmittance ratio of the liquid crystal element for light adjustment 5 (a flux of light transmitting through the liquid crystal element for light adjustment 5) and the white balance of light emitted from the liquid crystal element for light adjustment 5 (the relationship between the time allocation for the transmittance ratio 100% and for the transmittance ratio 0%, and the white balance of light emitted from the liquid crystal element for light adjustment). This proportional formula, for example, is calculated from two points showing the white balance of light emitted from the liquid crystal element for light adjustment 5 when the transmittance rates of this liquid crystal element for light adjustment are 98% and 2%.

Further, the DSP (3) 36 obtains the values of voltage applied to the liquid crystal light valves 22, 23, and 24, or period of applying voltage to these liquid crystal light valves 22, 23, and 24, with simple calculation in order that light emitted from the liquid crystal element for light adjustment 5 to these liquid crystal light valves 22, 23, and 24 becomes the desired white balance. Then, this DSP determines a white balance control signal (a control signal) based on this calculated value). Furthermore, the white balance control signal determined by the DSP (3) 36 is inputted to the panel driver 38 via a DA converter 37 and controls the panel driver 38 based on the white balance control signal. Then, the panel driver 38 applies voltage based on this white balance control signal to these liquid crystal light valves 22, 23, and 24, or applies voltage for a certain period so as to drive each of these liquid crystal light valves 22, 23, and 24. Thus, this operation corrects the above image signal such that the dynamic range of an image can be expanded and a smooth gray scale reproduction can be realized.

Here, regarding a method of controlling the illumination device 1, [1] control in response to a display image, [2] control according to a projection enlargement ratio and [3] control from the outside are considered. Each of these methods is explained hereafter.

[1] Control in Response to a Display Image

At first, control in response to a display image, namely, control of brightness in response to a display image where a flux of light is increased in a bright image scene and a flux of light is decreased in dark image scene is considered. In this case, as explained above, the brightness control signal is determined by the DSP (1) 32 based on the image signal. As such method, for example, the following three ways (a) to (c) are considered.

(a) A method of determining the bright control signal corresponding to the value of gray scale, of which brightness is maximum among pixel data included in the noticed frame.

An image signal including the 256 steps of gray scale from 0 to 255 is assumed. If the arbitrary 1 frame constituting a continuous image is considered, it is assumed that distribution of frequency of occurrence (histogram) every gray scale value of image data included in such frame becomes a state shown in FIG. 3. In this figure, since the gray scale value having the maximum brightness included in the histogram is 190, this gray scale value 190 is determined as the brightness control signal. This method can express the most faithful brightness toward an input image signal.

(b) A method of determining the brightness control signal corresponding to the gray scale value, which is specific ratio (10% for example) of frequency of occurrence from the maximum brightness in the distribution of frequency of occurrence (histogram) every gray scale value included in the noticed frame.

For example, if the distribution of frequency of image signal's occurrence is a state shown in FIG. 4, an area of 10% from the bright side is cited in the histogram. If the gray scale value corresponding to 10% is 230, this gray scale value 230 is determined as the brightness control signal. If there is unexpected data in the vicinities of the gray scale value; 255 in the histogram shown in FIG. 4, the gray scale value 255 becomes the brightness control signal when the above method (a) is adopted. However, this unexpected data does not make sense as information in the whole image. On the other hand, it is said that the present method, in which the gray scale value 230 is the brightness control signal, is a method of determination with the area having specific meaning as information in the whole image. Here, the above ratio can be changed within the range approximately from 1% to 50%.

(c) A method of dividing an image into plural blocks, and obtaining the average values of gray scale for the pixels included in each block such that the maximum value becomes the bright control signal.

As shown in FIG. 5, for example, a whole image is divided into m×n pieces of blocks, and average values of brightness (gray scale) of each of the blocks A11, . . . , Amn are calculated such that the maximum value among them becomes the brightness control signal. Here, it is desirable for the number of parts divided from an image to be around 6 to 200. This method is a method that can control brightness without losing ambient atmosphere of the whole image.

Regarding the method of above (a) to (c), determining the brightness control signal can be applied to the specific region such as the central area of displaying region, for example, in addition to the whole area of displaying region. In this case, a control method of determining brightness from the area noticed by a viewer can be available.

Next, the DSP (2) 33 controls the light adjustment element driver 34 based on the above determined brightness control signal. The following methods (d) and (e) are considered in order to do it.

(d) A method of controlling in real time in response to the outputted brightness control signal.

In this case, signal processing with DSP (2) 33 is unnecessary since the brightness control signal outputted from the DSP (1) 32 can be directly applied to the light adjustment element driver 34. This method is ideal in view of perfectly following the brightness of an image. However, the brightness and darkness of an image can vary with a short cycle depending on the content of an image. Thus, there may be a problem where a viewer feels too much stress when watching such image.

(e) A method of control with an output signal obtained by filtering the outputted brightness control signal via a LPF (a low pass filter).

For example, changed portion of the brightness control signal that is cut less than or equal to 1–30 seconds is cut by the LPF, then control is implemented by the output signal. According to this method, changed portion during a slight period can be cut such that change of the brightness and darkness of an image during such slight period can be avoided.

[2] Control According to Projection Enlargement Ratio

This control is implemented in response to zooming of the projection lens 26. A flux of light per unit area at the liquid crystal light valve (an area to be illuminated) is usually fixed such that there is a tendency where an enlarged image darkens and a reduced image brightens. Hence, in order to correct this situation, the liquid crystal element for light adjustment 5 is controlled such that a flux of light is increased when the size of an image is changed toward the enlarging side and a flux of light is decreased when the side of an image is changed toward the reducing side.

[3] Control from Outside

Here, a user can control the liquid crystal display element for light adjustment 5 according to his/her taste. For example, the liquid crystal element for light adjustment 5 is controlled such that a flux of light is decreased under dark environment for viewing, and increased under bright environment for viewing. In this case, the structure may be such that a user adjusts a flux of light by using a controller or directly operating the liquid crystal element for light adjustment. Also, the structure may be such that a flux of light is controlled automatically by installing a brightness sensor. However, in order to implement control such as [2] and [3], circuitry such as DSP (1) 32 to DSP (3) 36 shown in FIG. 2 are not necessary and circuits except them are necessary.

According to the projection type display 30 of the present exemplary embodiment, a flux of light emitted from the uniform illumination means can be adjusted by driving the liquid crystal element 5 for light adjustment with time-sharing based on the outside information. Besides, color tone of such light can be corrected by changing voltage applied to the above liquid crystal light valves based on signals applied to liquid crystal element for light adjustment 5. Hence, a light, of which brightness is desired level and white balance is corrected, can be obtained even when the light-emitting intensity of the light source is fixed. Thus, the dynamic range of a projection type display can be expanded, and it is advantageous in that a projection type display superior in an image expression and adaptability to operating environment can be realized.

In addition, in the above exemplary embodiment, it was explained that the present invention is applied to a projection type display, but it is also possible to apply it to a direct viewing type display.

Figure 7:
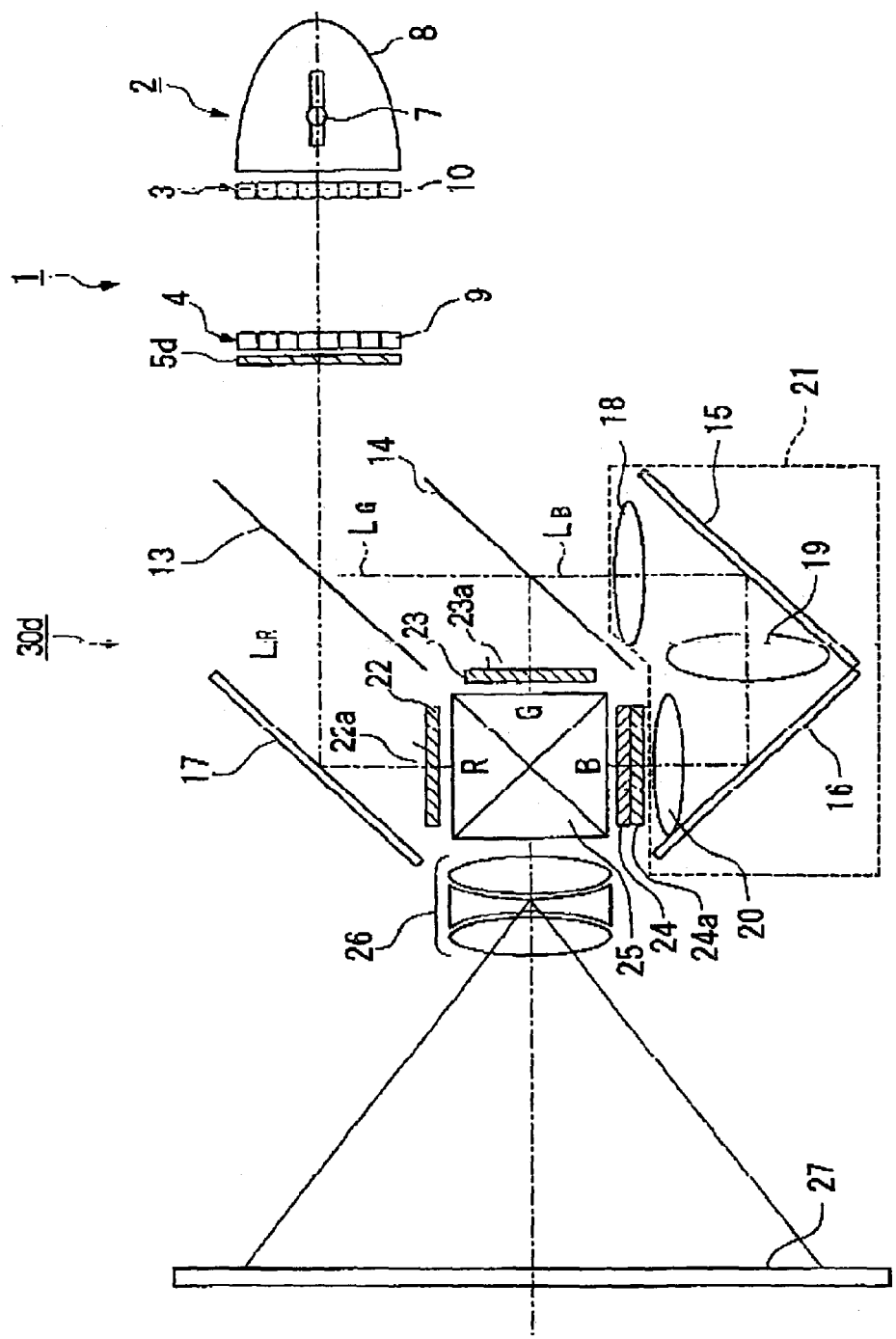
FIG. 7 is a schematic showing a projection type liquid crystal display of the second exemplary embodiment of the present invention.

Next, the second exemplary embodiment of a projection type display of the present invention is explained. FIG. 7 is a schematic of the projection type display of the second exemplary embodiment. This projection type display 30d is a projection type liquid crystal color display provided with three panels of the transmissive type liquid crystal light valves for color lights such as R (red), G (green), and B (blue) light, respectively. FIG. 7 shows, using reference numbers, an illumination device 1, a light source 2, fly-eye lenses 3 and 4 (uniform illumination device), a polarized light converter 5d, dichroic mirrors 13 and 14 (color separating device), reflection mirrors 15, 16 and 17, first liquid crystal elements for light adjustment 22a, 23a, and 24a (first light adjustment device), liquid crystal light valves 22, 23, and 24 (light modulation device), a cross dichroic prism 25 and a projection lens 26 (a projection device). Here, the structural elements that are referred to as the same reference numbers of those in the projection type display 30 in the first exemplary embodiment of FIG. 1, have the same constitution in the projection type display 30 of the first exemplary embodiment, if there is no specific explanation.

The illumination device 1 in the second exemplary embodiment includes the light source 2, the fly-eye lens 3 and 4, and the polarized light converter 5d. The light source 2 includes a lamp 7, such as a high-pressure mercury lamp and a reflector 8 to reflect light of the lamp 7. In addition, as a uniform illumination device to make illumination distribution of light source uniform at the liquid crystal light valves 22, 23, and 24 to be illuminated, the first fly-eye lens 3 and the second fly-eye lens 4 are installed in order from the light source 2 side. Each of the fly-eye lenses 3 and 4 include plural optical lenses 9 and 10 (6×8 pieces of lenses in this exemplary embodiment, for example) and function as the uniform illumination device to make illumination distribution of light emitted from the light source 2 uniform at the liquid crystal light valves to be illuminated. The uniform illumination device emits a light from the light source 2 to the polarized light converter 5d.

The polarized light converter 5d includes a polarization beam splitter array (PBS array) installed at the side of the uniform illumination means and a ½ wave length plate array installed at the side of the dichroic mirror 13. This polarized light converter 5d is installed between the uniform illumination device and the dichroic mirror 13.

The latter stage regarding a structure of the illumination device 1 is explained along with function of each of the structural elements hereafter.

A dichroic mirror 13, for reflecting a blue light and a green light, transmits a red light LR among 1 light flux from the light source 2, and reflects a blue light LB and a green light LG. The red light LR transmitted through the dichroic mirror 13 is reflected with the reflection mirror 17 and incident onto the liquid crystal element for red light adjustment 22a (the first light adjustment device) so as to adjust light intensity (a flux of light). Then, the red light LR is incident onto the liquid crystal light valve for red light 22. The liquid crystal element for red light adjustment 22a is located between the reflection mirror 17 located at the side of the dichroic mirror 13 and the liquid crystal light valve for red light 22.

On the other hand, among colored lights reflected at the dichroic mirror 13, the green light LG is reflected at the dichroic mirror for reflecting green light 14 and incident onto the liquid crystal element for green light adjustment 23a (the first light adjustment device) so as to adjust light intensity (a flux of light). Then, the green light LG is incident onto the liquid crystal light valve for green light 23. The liquid crystal element for green light adjustment 23a is located between the dichroic mirror 14 located at the side of the dichroic mirror 13 and the liquid crystal light valve for green light 23.

On the other hand, the blue light LB transmits through the dichroic mirror 14 and passes through the relay system 21 including the relay lens 18, the reflection mirror 15, the relay lens 19, the reflection mirror 16, and the relay lens 20. Then, the blue light LB is incident onto the liquid crystal element for blue light adjustment 24a (the first light adjustment device), so that the light intensity (a flux of light) is adjusted. Subsequently, the blue light LB is incident onto the liquid crystal light valve for blue light 24. The liquid crystal element for blue light adjustment 24a is located between the relay lens 20 located at the side of the dichroic mirror 14 and the liquid crystal light valve for blue light 24.

The above liquid crystal element for light adjustment, structured as the first light adjustment device, includes a liquid crystal display panel including a liquid crystal layer sandwiched between a pair of glass substrates (light-transmissive substrates), a light transmissive-electrode formed on each of the pair of glass substrates on the side of the liquid crystal layer and an orientation layer on the light-transmissive electrode at the side of the liquid crystal layer and polarizers at the both sides of the liquid crystal panel. As liquid crystal sandwiched between the pair of glass substrates, a TN type material is used.

It is desirable that the polarizer, installed at least at the light-emitting side, among polarizers installed on both sides of the liquid crystal display panel, has light-proof property. The polarizer having such light-proof property is preferably a structural birefringence type, such as wire grid polarizing plate where plural aluminum ribs are arranged as stripes at the light incident side with a pitch smaller than the wavelength of light incident onto the liquid crystal display layer. The polarizer having plural light reflection bodies, can transmit a specific polarized light and reflect other specific polarized light.

When applying voltage to the light-transmissive electrode, in response to a drive signal received from a light adjustment element driver 34 to be described later, the liquid crystal element for red light adjustment 22a can freely change the transmittance ratio in the range from the value close to 0% to 100%, by changing the value of the applied voltage. Hence, by changing the transmittance ratio in the range from the value close to 0% to 100%, the intensity of red light LR (a flux of light), emitted from the liquid crystal element for red light adjustment 22a, can be changed. Consequently, the transmittance ratio is increased by lowering applied voltage depending on an image so as to increase the intensity of the red light LR (a flux of light). Or, the transmittance ratio is decreased by rising applied voltage so as to decrease the intensity of the red light LR (a flux of light). Thus, the intensity of the red light LR (a flux of light) can be adjusted by the liquid crystal element for red light adjustment 22a.

When applying voltage to the light-transmissive electrode, in response to a drive signal received from the light adjustment element driver to be described later, the liquid crystal element for green light adjustment 23a can freely change the transmittance ratio in the range from the value close to 0% to 100% by changing the value of the applied voltage. Thus, by changing the transmittance ratio in the range from the value close to 0% to 100%, the intensity of green light LG (a flux of light) emitted from the liquid crystal element for green light adjustment 23a can be changed such that the intensity of the green light LG (a flux of light) can be adjusted by this liquid crystal element for green light adjustment 23a.

When applying voltage to the light-transmissive electrode, in response to a drive signal received from the light adjustment element driver to be described later, the liquid crystal element for blue light adjustment 24a can freely change the transmittance ratio in the range from the value close to 0% to 100% by changing the value of the applied voltage. Thus, by changing the transmittance ratio in the range from the value close to 0% to 100%, the intensity of blue light LB (a flux of light) emitted from the liquid crystal element for blue light adjustment 24a can be changed such that the intensity of the blue light LB (a flux of light) can be adjusted by this liquid crystal element for blue light adjustment 24a.

Three colored lights modulated by the liquid crystal light valves 22, 23, and 24, are incident onto the cross dychroic prism 25. This prism includes four rectangular prisms attached together, and a dielectric multilayer film reflecting the red light and another dielectric multilayer film reflecting blue light that are arranged in a cross state together inside of these prisms. These dielectric multilayer films integrate three color lights so as to form a light showing a color image. This integrated light is projected onto a screen 27 via a projection lens 26 within a projection optical system so as to display an enlarged image.

Next, a driving method of the projection type liquid crystal display 30d of the second exemplary embodiment is explained.

Figure 8:
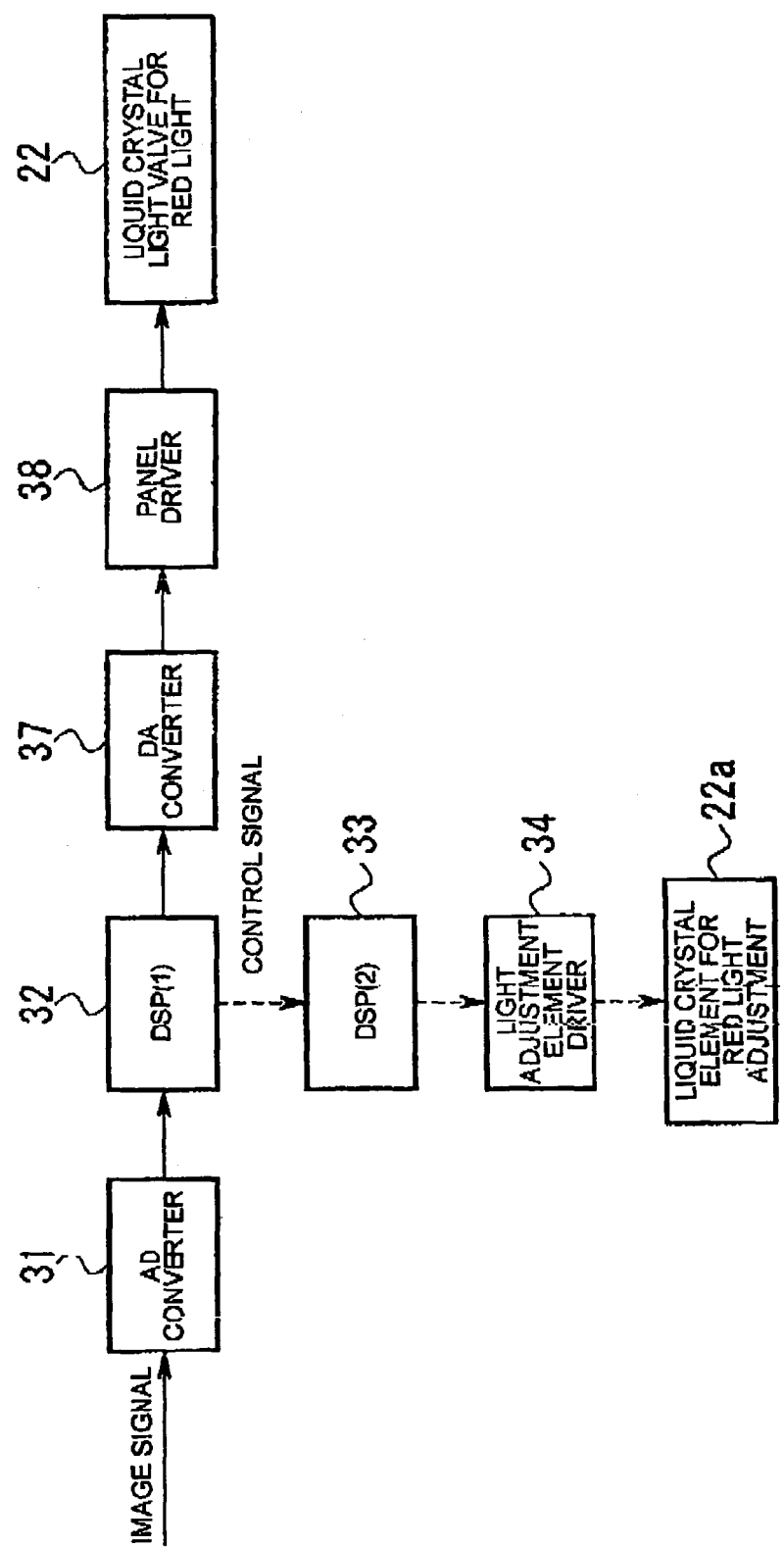
FIG. 8 is a block schematic showing a drive circuit of the projection type liquid crystal display of the second exemplary embodiment.

FIG. 8 is a block schematic showing a structure of a drive circuit for the projection type liquid crystal display 30d of the second exemplary embodiment. In case of the related art projection type liquid crystal display without a light adjustment function, an inputted image signal is supplied directly to a liquid crystal panel driver after appropriately corrected. On the other hand, in the present exemplary embodiment, which includes a light adjustment function and controls the intensity of each of the color lights based on an image signal, a digital signal processing blocks of circuits DSP (1) to DSP (2) are necessary as a basic structure and explained below.

Figure 9:
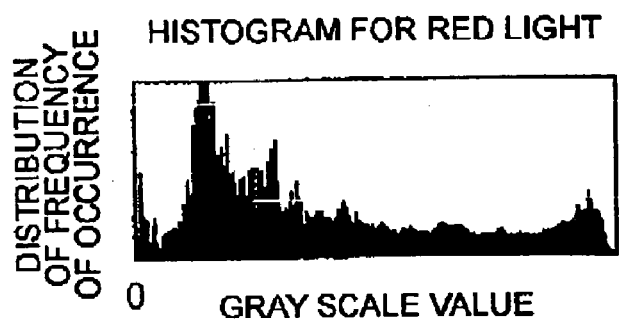
FIGS. 9(a) and 9(b) are schematics showing an example of distribution of frequency of appearing (histogram) every gray scale levels for each of the color lights obtained from an image signal during 1 frame constituting an image.
Figure 9:
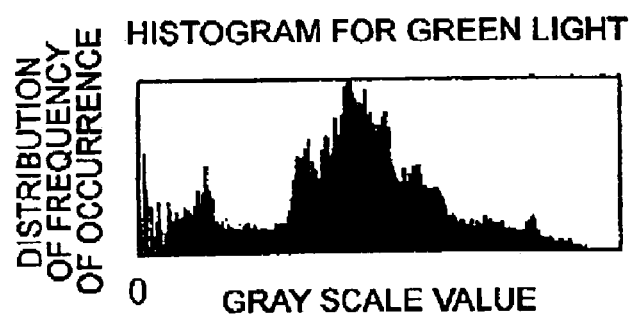
Figure 9:
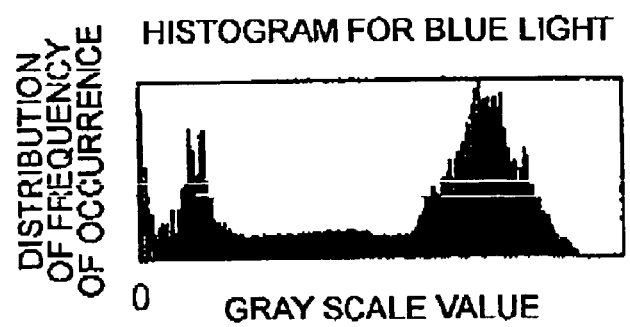

In the present exemplary embodiment, as shown in FIG. 8, an image signal inputted as an analog signal is applied to the DSP (1) 32 that is the first digital signal processing circuitry (a control signal determination device) through the AD converter 31. In DSP (1), the histogram of each of the red light LR, the green light LG, the blue light LB is taken out from the image signal. FIG. 9 is a schematic showing an example of a distribution of frequency of occurrence (histogram) every value of gray scale for each color obtained from the image signal during arbitrary 1 frame constituting an image. FIG. 9(a) shows distribution of frequency of occurrence every gray scale for red color, FIG. 9(b) shows distribution of frequency of occurrence every value of gray scale for green color, and FIG. 9(c) shows distribution of frequency of occurrence every value of gray scale for blue color.

The DSP (1) 32 determines from the histogram of an image signal for red color a voltage value applied to the liquid crystal element for red light adjustment 22a, namely, the brightness control signal deciding the transmittance ratio for the liquid crystal element for red light adjustment 22a.

The DSP (2) 33 (light adjustment control device) controls the light adjustment element driver 34 based on the bright control signal determined by the DSP(1) 32 such that this driver 34 actually drives the liquid crystal element for red light adjustment 22a as the final stage. When driving the liquid crystal element for red light adjustment 22a, applied voltage is changed based on the bright control signal.

On the other hand, after the image signal inputted to the DSP (1) 32 is converted to an analog signal again by a DA converter 37, this analog image signal is inputted to the panel driver 38 and is supplied to the liquid crystal light valve for red light 22 from the panel driver 38.

In addition, the liquid crystal element for green light adjustment 23a is driven in a similar way that the liquid crystal element for red light adjustment 22a is driven, except that the bright control signal is determined by the DSP (1) based on the histogram of green color image signal. Regarding the liquid crystal light valve for green light 23, after the image signal inputted to the DSP (1) 32 is converted to an analog signal again by a DA converter 37 similarly to the above liquid crystal light valve for red light 22, this analog image signal is inputted to the panel driver 38 for driving the liquid crystal light valve for green light and is supplied to the liquid crystal light valve 22 for green light from the panel driver.

In addition, the liquid crystal element for blue light adjustment 24a is driven in a similar way that the liquid crystal element for red light adjustment 22a is driven, except that the brightness control signal is determined by the DSP (1) based on the histogram of blue color image signal. Regarding the liquid crystal light valve 24 for blue light, after the image signal inputted to the DSP (1) is converted to an analog signal again by a DA converter 37, similar to the above liquid crystal light valve 22 for red light, this analog image signal is inputted to the panel driver for driving the liquid crystal light valve for blue light and is supplied to the liquid crystal light valve for blue light 24 from the panel driver.

Based on this operation, the liquid crystal element for red light adjustment 22a, the liquid crystal element for green light adjustment 23a and the liquid crystal element for blue light adjustment 24a, are controlled based on the histogram of each color's image signal. Hence, the intensity of each color light transmitted through each of the liquid crystal elements for light adjustment (a flux of color light transmitting through each of the liquid crystal elements for light adjustment) can be adjusted such that the dynamic range of an image can be expanded, and fine gray scale reproduction can be realized.

Here, regarding a method of controlling the illumination device 1, [1] control in response to a display image, [2] control according to a projection enlargement ratio, and [3] control from the outside are considered. Each of these methods is explained hereafter.

[1] Control in Response to a Display Image

At first, control in response to a display image, namely control of brightness in response to a display image, where a flux of light is increased in bright image scene and a flux of light is decreased in dark image scene, is considered. In this case, as explained above, the brightness control signal is determined by the DSP (1) based on the image signal. As such method, for example, the following three ways (f) to (h) are considered.

(f) A method of determining the bright control signal corresponding to the value of gray scale, of which brightness is maximum among pixel data included in the noticed frame.

For example, an image signal including the 256 steps of gray scale from 0 to 255 is assumed. If the arbitrary 1 frame constituting a continuous image is paid attention, it is assumed that distribution of frequency of occurrence (histogram) every gray scale value of image data included in such frame becomes a state shown in FIG. 3. In this figure, since the gray scale value having the maximum brightness included in the histogram is 190, this gray scale value 190 is to be the brightness control signal. This method is a method that can express the most faithful brightness toward an input image signal.

(g) A method of determining the brightness control signal corresponding to the gray scale value that is specific ratio (10% for example) of frequency of occurrence from the maximum brightness in the distribution of frequency of occurrence (histogram) every gray scale value included in the noticed frame.

For example, if the distribution of frequency of an image signal's occurrence is a state shown in FIG. 4, an area of 10% from the bright side is cited in the histogram. If a gray scale value corresponding to 10% is 230, this gray scale value 230 is to be the brightness control signal. If there is an unexpected data in the vicinity of the gray scale value 255 as in the histogram shown in FIG. 4, the gray scale value 255 becomes the brightness control signal when the above method (f) is adopted. However, this unexpected data does not make sense as information in the whole image. On the other hand, it may be said that the present method, where the gray scale value 230 is the bright signal control signal, is a method of determination by the area having specific meaning as information in the whole image. Here, the above ratio can be changed within the range approximately from 1% to 50%.

(h) A method of dividing an image into plural blocks, and obtaining the average values of gray scale for the pixels included in the blocks, such that the maximum value becomes the bright control signal.

As shown in FIG. 5, for example, an image is divided into m×n pieces of blocks, and average value of brightness (gray scale) of each of the blocks A11, . . . , Amn (gray scale) is calculated such that the maximum value among them becomes the brightness control signal. Here, it is desirable for the number of divided partitions of an image to be around 6 to 200. This method is a method that can control brightness without losing ambient atmosphere of the whole image.

Regarding the methods of the above (f) to (h), determining the brightness control signal can be applied to the specific region such as the central area of displaying region, for example, in addition to the whole area of displaying region. In this case, a control method of determining brightness from the area noticed by a viewer can be available.

Next, the above DSP (2) controls the light adjustment element driver 34 based on the above determined brightness control signal. The following methods (i) and (j) are considered in order to do it.

(i) A method of controlling in real time in response to the outputted brightness control signal.

In this case, signal processing by DSP (2) is unnecessary since the brightness control signal outputted from the DSP (1) can be directly applied to the light adjustment element driver. This method is ideal in view of perfectly following brightness of an image. However, the brightness and darkness of an image can vary with a short cycle depending on the content of an image such that there may be a problem where a viewer feels too much stress when watching such image.

(j) A method of control with an output signal obtained by filtering the outputted brightness control signal via a LPF (a low pass filter).

For example, a changed portion of the brightness control signal that is less than or equal to 1–30 seconds is cut by the LPF, then control is implemented by the output signal. According to this method, the changed portion during a slight period can be cut, such that change of the brightness and darkness of an image in such slight period can be avoided.

[2] Control According to Projection Enlargement Ratio

This control is implemented in response to enlargement ratio of the projection lens 26. An flux of light per unit area at the liquid crystal light valve is usually fixed such that there is a tendency that an enlarged image darkens and a reduced image brightens. Hence, in order to correct this situation, the liquid crystal element for light adjustment 5 is controlled such that a flux of light is increased when the size of an image is enlarged and a flux of light is decreased when the size of an image is reduced.

[3] Control from Outside

Here, a user can control the liquid crystal elements for light adjustment 22a, 23a, and 24a according to his/her taste. For example, the liquid crystal elements for light adjustment 22a, 23a, and 24a are controlled such that a flux of light is decreased under a dark environment for viewing and increased under a bright environment for viewing. In this case, the structure may be such that a user adjusts a flux of light by using a controller or directly operating the liquid crystal elements for light adjustment 22a, 23a, and 24a. The structure may also be such that a flux of light is automatically controlled by installing a brightness sensor. However, in order to implement control such as [2] and [3], circuitry such as DSP (1) 32 to DSP (2) 33 shown in FIG. 8 is not necessary. Circuits except them are necessary.

According to the projection type display 30d of the second exemplary embodiment, the intensity of every color light (a flux of light), obtained after separating light from the light source 2 into color lights, can be adjusted by changing voltage applied to the liquid crystal elements for light adjustment 22a, 23a, and 24a based on the outside information. Hence, the desired light intensity can be obtained at the liquid crystal light valves 22, 23, and 24 even when the light-emitting intensity of the light source 2 is fixed. Thus, the dynamic range of a projection type display can be expanded, and a projection type display superior in an image expression and adaptability to operating environment can be realized.

In addition, the liquid crystal element for blue light adjustment 24a is installed between the dichroic mirror 14 and the liquid crystal display valve for blue light 24, such that the liquid crystal element for blue light 24a can adjust the intensity of light (a flux of light). Therefore, the intensity of blue light (a flux of light) incident on the liquid crystal light valve for blue light 24 can be decreased in case of an image having weak blue color. Hence, deterioration of a liquid crystal panel in the liquid crystal light valve for blue light 24, due to the blue light can be avoided, and the light-proof property of the liquid crystal light valve for blue light 24 can be improved.

Figure 10:
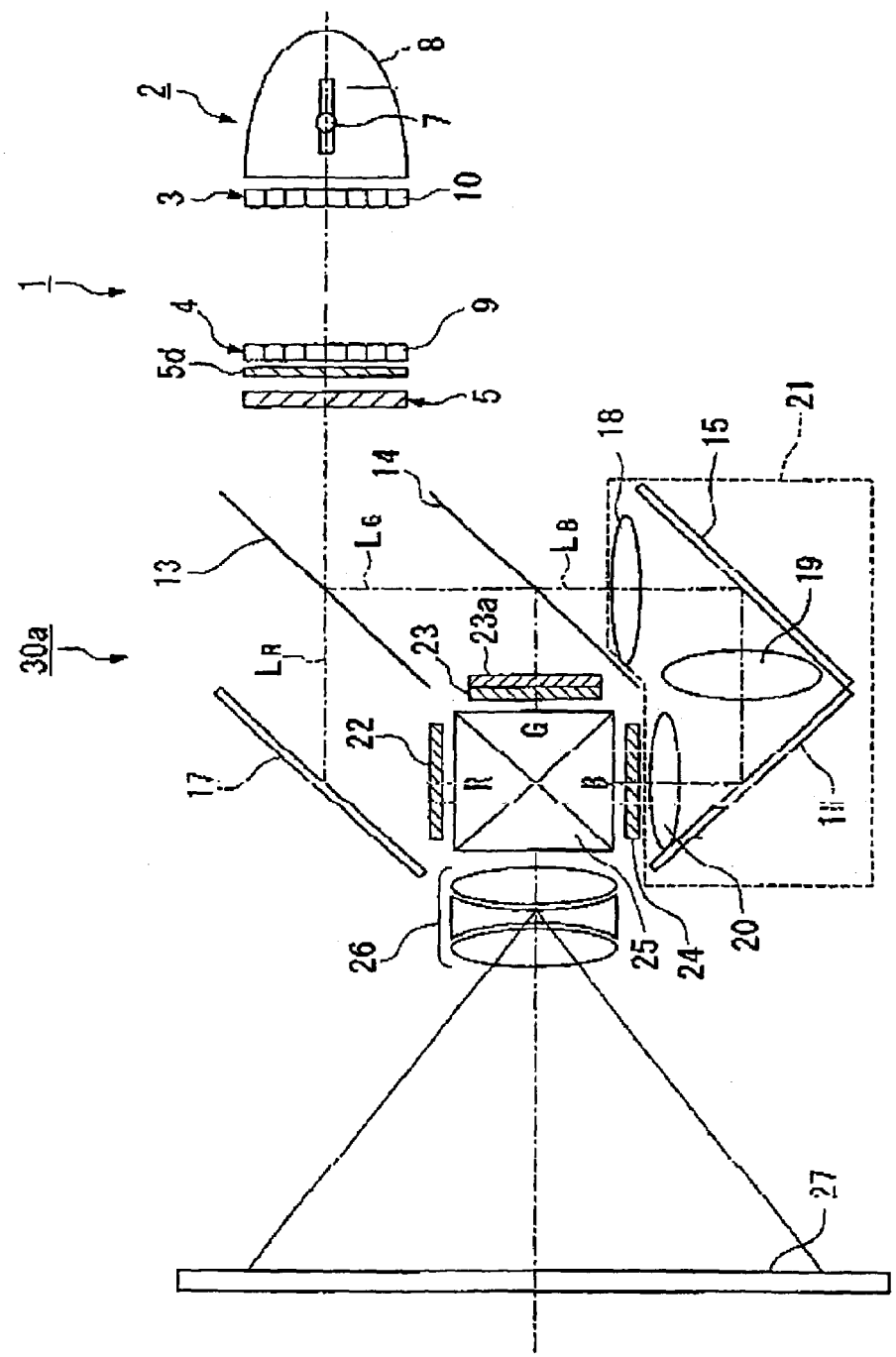
FIG. 10 is a schematic showing a projection type liquid crystal display of the third exemplary embodiment of the present invention.

Next, the third exemplary embodiment of the projection type display of the present invention is described. FIG. 10 is a schematic showing the projection type liquid crystal display of the third exemplary embodiment. The difference between a projection type liquid crystal display 30a of the third exemplary embodiment and the projection type liquid crystal display 30d of the second exemplary embodiment shown in FIG. 7 and FIG. 8 is that the second liquid crystal element for light adjustment 5 (the second light adjustment device) is installed between the illumination device 1 and the dichroic mirror 13 and, as the first liquid crystal element for light adjustment, only the liquid crystal element for green light adjustment 23a is installed.

The second liquid crystal element for light adjustment 5 includes the same structure as the above first liquid crystal element for light adjustment.

When applying voltage to the light-transmissive electrode in response to the driving signal received from the light adjustment element driver for driving the second liquid crystal element for light adjustment described later, this liquid crystal element for light adjustment 5 changes the value of the applied voltage, for example, so as to change freely the transmittance ratio in the range from the value close to 0% to 100%. In addition, changing the light transmittance ratio from the value close to 0% to 100% in this manner can also change the intensity of light (a flux of light) emitted from the liquid crystal element for light adjustment 5 such that a flux of light is increased by lowering the applied voltage in case of a bright image scene, and a flux of light is decreased by rising the applied voltage in case of a dark image scene. Hence, the light intensity (a flux of light) can be adjusted in advance before color separation.

Here, a method of controlling the liquid crystal element for light adjustment 5 is described.

According to the present exemplary embodiment, the inputted image signal as an analog signal is inputted into the DSP (1) (a control signal determination means) that is a digital signal processing circuit via an AD converter. This DSP (1) determines a voltage value applied to the second liquid crystal element for light adjustment 5, namely, the brightness control signal deciding the transmittance ratio of the liquid crystal element for light adjustment. The brightness control signal determined by the DSP (1) is inputted to the DSP (2) (a light adjustment control device). This DSP (2) (the light adjustment control device) controls the light adjustment element driver for driving the second liquid crystal element for light adjustment based on the brightness control signal determined by the DSP (1) such that this the light adjustment element driver actually drives the liquid crystal element for light adjustment 5 at the final stage. Here, when driving the second liquid crystal element for light adjustment 5, applied voltage can be changed based on the above brightness control signal.

Thus, in the present exemplary embodiment, the intensity of light (a flux of light) emitted from the illumination device 1 can be adjusted before color separation by controlling the liquid crystal element for light adjustment 5 and incident on the dichroic mirror 13 hereafter.

The red light LR among light emitted from the illumination device 1 and incident on the dichroic mirror 13, transmits through the dichroic mirror 13, is reflected at the reflection mirror 17 and is incident on the liquid crystal light valve 22 for red light.

On the other hand, the green light LG among light emitted from the illumination device 1 and incident on the dichroic mirror 13 is reflected at the dichroic mirror 13 and further reflected at the dichroic mirror 14 for reflecting green light. Then, this light is incident on the liquid crystal element for green light adjustment 23a (the first light adjustment device) and further incident on the liquid crystal light valve 23 for green light after the intensity of light (a flux of light) is adjusted based on the histogram of the green image signal similarly to the second exemplary embodiment.

In addition, the blue light LB among light emitted from the illumination device 1 and incident on the dichroic mirror 13 is reflected at the dichroic mirror 13, transmits through the dichroic mirror 14 and the relay system 21 including the relay lens 18, the reflection mirror 15, the relay lens 19, the reflection mirror 16 and the relay lens 20 and is incident on the liquid crystal light valve 24 for blue light.

According to the projection type display 30a of the present exemplary embodiment, the intensity of light (a flux of light) emitted from the light source 5 is adjusted in advance based on the information from outside by the second liquid crystal element for light adjustment 5 before color separation. Then, the intensity of the green light LG among plural color lights after color separation is adjusted by the liquid crystal element 23a for green light adjustment (the first liquid crystal element for light adjustment). For example, when an image is evening scenery or blue sky, the intensity of the green light LG is decreased by controlling the liquid crystal element for green light adjustment 23a such that the range of gray scale of green color can be precisely controlled and the gray scale reproduction of green color can be improved. Green light has high visual sensitivity from a viewer such that an image seems to be dark if the green color light is weak, even when the red or blue light is strong. In an image such as evening scenery, it is necessary that red light is emitted strongly. When a light adjustment device is installed before color separation, a flux of light cannot be decreased whereas an image looks dark. As a result, green gray scale reproduction becomes worse, and good image display is not provided. On the other hand, according to the above mentioned projection type display 30a, a flux of the green light LG among plural color lights after color separation can be adjusted by the liquid crystal element for green light adjustment 23a, such that desirable image expression can be attained effectively even if color tone of an image is deviated like a blue sky or an evening scenery.

Figure 11:
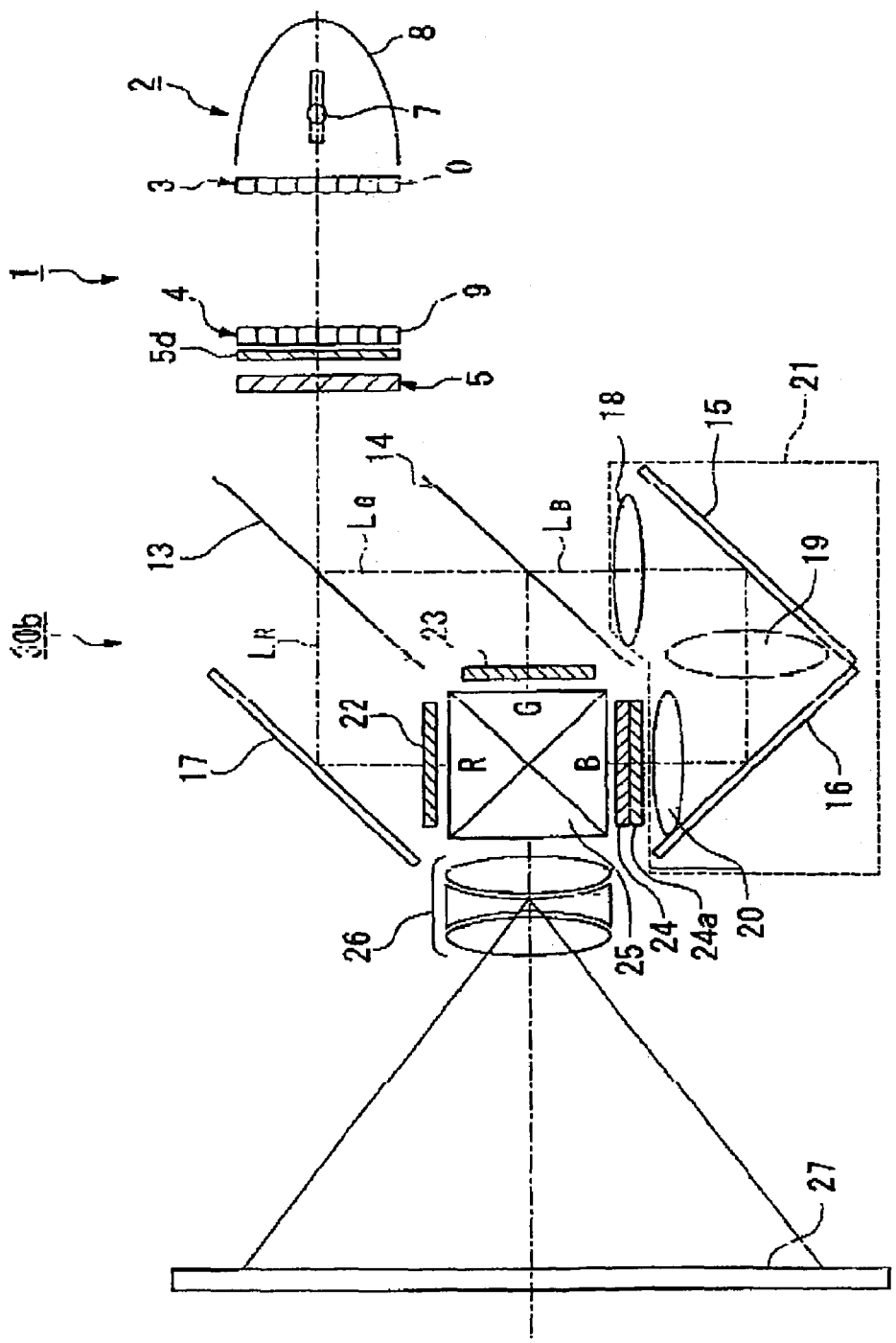
FIG. 11 is a schematic showing a projection type liquid crystal display of the fourth exemplary embodiment of the present invention.

Next, the fourth exemplary embodiment of the projection type display of the present invention is described. FIG. 11 is a schematic showing a projection type liquid crystal display of the fourth exemplary embodiment. The difference between a projection type liquid crystal display 30b of the fourth exemplary embodiment and the projection type liquid crystal display 30d the second exemplary embodiment shown in FIG. 7 and FIG. 8 is that the second liquid crystal element for light adjustment 5 (the second light adjustment device) is installed between the illumination device 1 and the dichroic mirror 13, and as the first liquid crystal element for light adjustment, only the liquid crystal element for blue light adjustment 24a is installed.

The second liquid crystal element for light adjustment 5 has the same structure of the above first liquid crystal element for light adjustment. The function of this second liquid crystal element 5 for light adjustment is similar to the second exemplary embodiment, and the intensity of light (a flux of light) emitted from the light source 2 can be adjusted in advance before color separation. A method of controlling a liquid crystal element for light adjustment is also similar to the second exemplary embodiment. Hence, in the present exemplary embodiment, similar to the second exemplary embodiment, the intensity of light (a flux of light) emitted from the light illumination device 1 is adjusted before color separation by controlling the second liquid crystal element for light adjustment 2 and incident on the dichroic mirror 13 thereafter.

The red light LR, among light emitted from the illumination device 1 and incident on the dichroic mirror 13, transmits through the dichroic mirror 13, is reflected at the reflection mirror 17 and incident on the liquid crystal light valve 22 for red light.

On the other hand, the green light LG, among light emitted from the illumination device 1 and incident on the dichroic mirror 13, is reflected at the dichroic mirror 13 and further reflected at the dichroic mirror 14 for reflecting green light. Then, this light is incident on the liquid crystal light valve 23 for green light.

In addition, the blue light LB, among light emitted from the illumination device 1 and incident on the dichroic mirror 13, is reflected at the dichroic mirror 13, transmits through the dichroic mirror 14 and the relay system 21 including the relay lens 18, the reflection mirror 15, the relay lens 19, the reflection mirror 16 and the relay lens 20 and is incident on the liquid crystal element for blue light adjustment 24a (the first light adjustment device). Then, a flux of light is adjusted based on the histogram of the blue light image signal similarly to the second exemplary embodiment. Further, blue light is incident on the liquid crystal light valve 24 for blue light.

According to the projection type display 30b of the present exemplary embodiment, the intensity of light (a flux of light) emitted from the light source 2 is adjusted in advance by the second liquid crystal element for light adjustment 5 before color separation based on information from outside. Then, the intensity of the blue light LB, (a flux of light) among plural color lights after color separation, is adjusted by the liquid crystal element for blue light adjustment 24a. For example, when an image is evening scenery, the intensity of blue light LB can be decreased by controlling the liquid crystal element for blue light adjustment 24a.

Hence, in the projection type display of the present exemplary embodiment, the intensity of the blue light LB, (a flux of light) among plural color lights after color separation, is adjusted by the liquid crystal element for blue light adjustment 24a, such that an image expression is superior even when color tone is deviated like evening scenery.

In addition, according to the present exemplary embodiment, the liquid crystal element for blue light adjustment 24a capable of adjusting the intensity of blue light is installed between the dichroic mirror 14 and the liquid crystal light valve 24 for blue light such that the intensity of blue light (a flux of light) being incident on the liquid crystal light valve for blue light 24 can be decreased in case of an image having weak blue color. Hence, deterioration of the liquid crystal light valve for blue light 24 due to the blue light can be avoided, and the light-proof property of the liquid crystal light valve for blue light 24 as a blue light modulating device can be improved.

Figure 12:
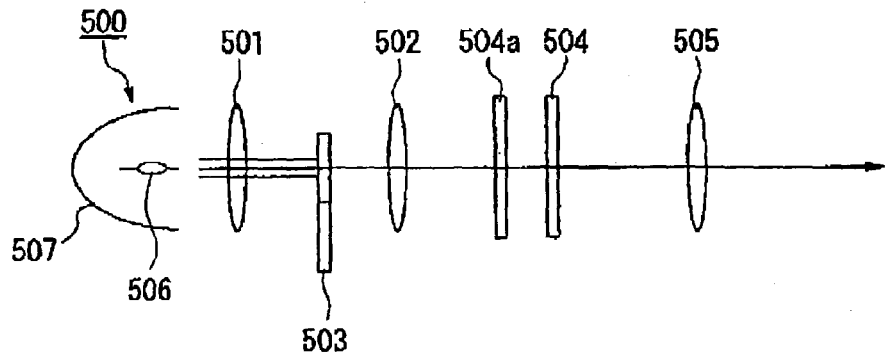
FIG. 12 is a schematic showing a projection type liquid crystal display of color sequential single panel system of the fifth exemplary embodiment of the present invention.

Next, the fifth exemplary embodiment of a projection type display of the present invention is described. FIG. 12 is a schematic of an example of a projection type liquid crystal display (a liquid crystal projector) using a method of a sequential color single panel (a field sequential color method) as the fifth exemplary embodiment of the projection type display.

In this projection type display of the fifth exemplary embodiment, an image corresponding to each color is sequentially switched and projected by a single light modulation device so as to realize color display.

The figure shows, using reference numerals, a light source 500, condenser lens 501 and 502, color wheel 503 (color separating device), the first liquid crystal element for light adjustment 504a (the first light adjustment device), liquid crystal light valve 504 (light modulation device), and projection lens 505.

The light source 500 includes a lamp 506 such as metal halide and a reflector 507 to reflect light from the lamp 506. After the white light from the light source 500 transmits through the condenser lens 501, it transmits through the color wheel 503 rotating with high speed such that red light, blue light, and green light are emitted sequentially every one 180th second for example. Then, each of the color lights transmits through the second condenser lens 502 afterwards. A flux of light transmitted through the second condenser lens 502 is adjusted by the first liquid crystal element for light adjustment 504a. Then, such light is incident onto a liquid crystal light valve 504, modulated here and projected onto a screen by the projection lens 505. Hence, enlarged image is displayed.

The first liquid crystal element for light adjustment 504a is installed between the second condenser lens 502 disposed on the side of the color wheel 503 and the liquid crystal light valve 504. The transmittance ratio of each of the color lights can be adjusted synchronously with emitting each color light from the color wheel 503. Further, a flux of color light transmitting through the first liquid crystal element for light adjustment 504a can be adjusted by controlling the first liquid crystal element for light adjustment 504a based on information from outside.

Next, a method of driving the projection type liquid crystal display of the fifth exemplary embodiment is described.

In the present exemplary embodiment, an image signal inputted as an analog signal is inputted to DSP (1) that is a digital signal processing circuit (a control signal determination means) via an AD converter. The DSP (1) takes a histogram for every color of red, green and blue from an image signal.

Figure 13:
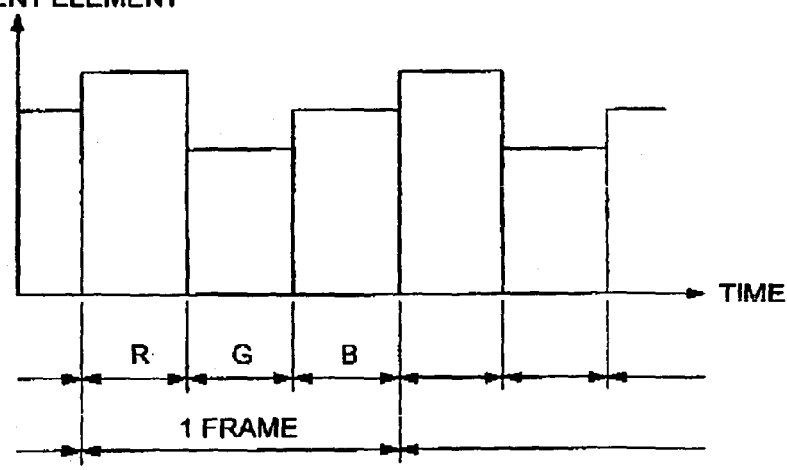
FIG. 13 is a schematic showing an example of controlling the transmittance ratio of a first liquid crystal element for light adjustment (the first light adjustment means) in the fifth exemplary embodiment of the present invention.

The DSP (1) determines the brightness control signal every color during 1 frame. The brightness control signal decides voltage (transmittance ratio corresponding to each color light) applied to the liquid crystal element 504a based on histogram for each color obtained from an image signal. This brightness control signal is inputted to the DSP (2) (light control device). FIG. 13 is a schematic showing an example of transmittance ratio of the first liquid crystal element for light adjustment (the first light adjustment element). In FIG. 13, R stands for red light, G, for green light, B for blue light.

On the other hand, a synchronizing signal generation device, connected to the drive circuit for controlling timing of driving the color wheel 503, inputs a synchronizing signal to the DSP (2). This signal synchronizes timing of emitting each color light from the color wheel 503 with timing of driving the first liquid crystal element for light adjustment 504a.

Further, the DSP (2) controls the light adjustment element driver based on the brightness control signal determined by the DSP (1) and the synchronizing signal such that the light adjustment element driver actually drives the first liquid crystal element for light adjustment 504a as the final stage.

On the other hand, after an image signal inputted to the DSP (1) is converted to an analog signal again by the DA converter, this signal is input to the panel driver and is supplied to the liquid crystal light valve 504 (light modulation device) from the panel driver.

Hence, according to the projection type liquid crystal display of the fifth exemplary embodiment, the intensity of each of the color lights (a flux of light) obtained by separating light emitted from the light source 500 via the color wheel 503 can be adjusted by controlling the first liquid crystal element for light adjustment 504a. Thus, the desired intensity of color light (a flux of light) can be obtained by the first liquid crystal element for light adjustment 504a even when the light intensity of the light source 500 is fixed, such that the dynamic range of a projection type display can be expanded, and a projection type display superior in an image expression and adaptability to operating environment can realized.

Figure 14:
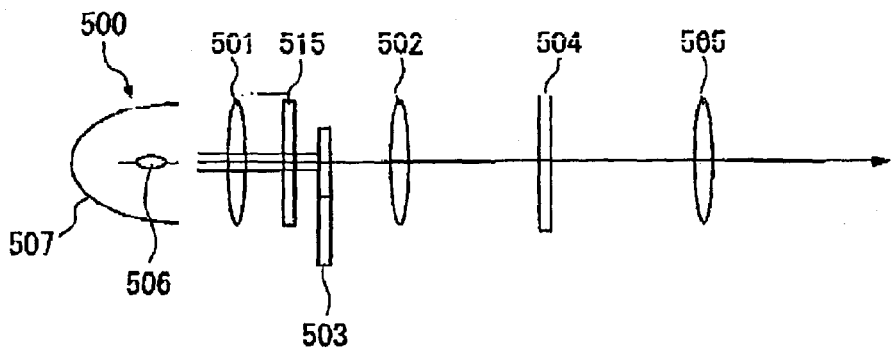
FIG. 14 is a schematic showing a projection type liquid crystal display of color sequential single panel system of the sixth exemplary embodiment of the present invention.

A projection type display of the sixth exemplary embodiment is described. FIG. 14 is a schematic showing another example of the projection type liquid crystal display of the sequential color panel method as the projection type display of the sixth exemplary embodiment. The difference between the projection type liquid crystal display of the sixth exemplary embodiment and the projection type liquid crystal display of the fifth exemplary embodiment shown in FIG. 12 is that the second liquid crystal element for light adjustment 515 (the second light adjustment device) is installed between the condenser lens 501 arranged at the side of the light source 500 and the color wheel 503. In addition, in the fifth exemplary embodiment, the first liquid crystal element for light adjustment is not provided between the color wheel 503 and the liquid crystal light valve 504.

In this exemplary embodiment, after white light from the light source 500 transmits through the first condenser lens 501, its intensity is adjusted by the second liquid crystal element 515 for light adjustment. Then, this light transmits through the color wheel 503 rotating with high speed, such that red light, blue light, and green light are emitted sequentially every one-180th second, for example. Then, each of the emitted color lights transmits through the second condenser lens 502 afterwards. Each of the color lights transmitted through the second condenser lens 502 is incident on the liquid crystal light valve 504 and modulated here. Then, this modulated light is projected onto a screen (not shown in the figure) by the projection lens 505 and displayed as an enlarged image.

The second liquid crystal element for light adjustment 515 can adjust the intensity of light (a flux of light) emitted from the light source 500 synchronously with timing of separating light into color lights at the color wheel 503. Further, the intensity of light (a flux of light) emitted from the light source 500 and transmitted through the second liquid crystal element for light adjustment 515 can be adjusted by controlling the second liquid crystal element for light adjustment 515 based on the information from outside.

Next, a method of driving the projection type liquid crystal display of the sixth exemplary embodiment is explained.

In this exemplary embodiment, an image signal inputted as an analog signal is inputted to DSP (1), which is a digital signal processing circuitry (a control signal determination device) through an AD converter. The DSP (1) takes out histograms of red, green, and blue colors from an image signal.

The DSP (1) determines the brightness control signal deciding voltage applied to the second liquid crystal element for light adjustment 515 based on the histogram of each color obtained from an image signal. This brightness control signal is inputted to the DSP (2) (a light adjustment control device).

On the other hand, a synchronizing signal generation device connected to the drive circuit for controlling timing of driving the color wheel 503, inputs a synchronizing signal to the DSP (2). This signal synchronizes timing of emitting each color light from the color wheel 503 with timing of driving the second liquid crystal element for light adjustment 515.

Further, the DSP (2) controls the light adjustment element driver based on the brightness control signal determined by the DSP (1) and the synchronizing signal such that the light adjustment element driver actually drives the second liquid crystal element for light adjustment 515 as the final stage.

On the other hand, after an image signal inputted to the DSP (1) is converted to an analog signal again by the DA converter, this signal is input to the panel driver and is supplied to the liquid crystal light valve 504 (a light modulation device) from the panel driver.

Hence, according to the projection type liquid crystal display of the sixth exemplary embodiment, the intensity of light (a flux of light) emitted from the light source 500 can be adjusted before color separation, by controlling the second liquid crystal element for light adjustment 515 based on the information from outside. Then, the intensity of color lights obtained by separating the above light via the color wheel 503 can be adjusted. Thus, the desired intensity of color light (a flux of light) can be obtained at the liquid crystal light valve 504 even when the light intensity of the light source 500 is fixed. Consequently, the dynamic range of a projection type display can be expanded, and a projection type display superior in an image expression and adaptability to operating environment can be realized.

Figure 15:
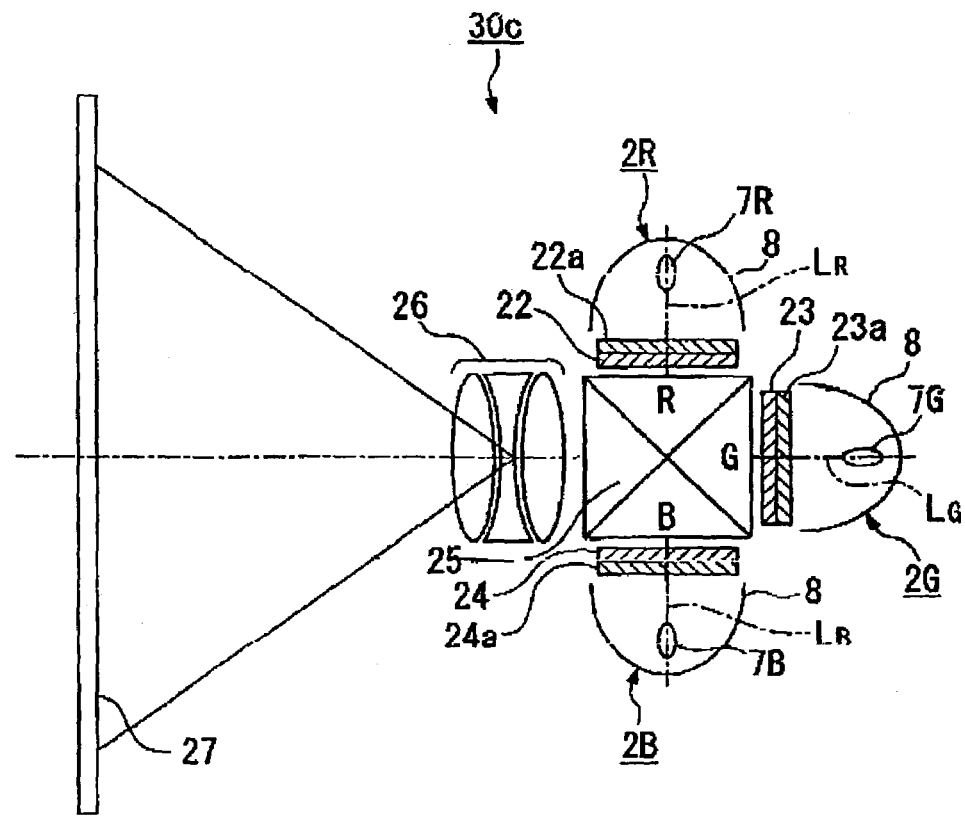
FIG. 15 is a schematic showing a projection type liquid crystal display of the seventh exemplary embodiment of the present invention.

Next, a projection type display of the seventh exemplary embodiment is described. FIG. 15 is a schematic showing a projection type liquid crystal display of the seventh exemplary embodiment. The difference between the projection type liquid crystal display 30c of the seventh exemplary embodiment and the projection type liquid crystal display 30d of the second exemplary embodiment shown in FIG. 7 and FIG. 8 is that the illumination device 1, the dichroic mirror 13 and 14 (a color separation device) for separating light emitted from the illumination device 1 into plural color lights, the relay lens 17 and the relay system 21 are provided in the second exemplary embodiment while light sources 2R, 2G and 2B emitting different color lights are provided in the seventh exemplary embodiment.

The light source 2R includes a lamp 7R emitting the red light LR and the reflector 8 reflecting light from the lamp 7R. The light source 2G includes a lamp 7G emitting the green light LG and the reflector 8 reflecting light from the lamp 7G. The light source 2B includes a lamp 7B emitting the blue light LB and the reflector 8 reflecting light from the lamp 7B. These lamps 7R, 7G and 7B include a light emitting diode (LED), an organic electroluminescence element (an organic EL element), an inorganic electroluminescence element (an inorganic EL) or others.

These light sources 2R, 2G, 2B are installed corresponding to these liquid crystal light valves (light modulation device) 22,23, and 24. The liquid crystal element for red light adjustment 22a (the first light adjustment device) is installed between the light source 2R and the liquid crystal light valve 22. The liquid crystal element for green light adjustment 23a (the first light adjustment device) is installed between the light source 2G and the liquid crystal light valve 23. The liquid crystal element for blue light adjustment 24a (the first light adjustment device) is installed between the light source 2B and the liquid crystal light valve for blue light 24.

The red light LR emitted from the light source 2R is incident on the liquid crystal element for red light adjustment 22a and its intensity is adjusted here based on the histogram of a red image signal similarly to the second exemplary embodiment. Then, this light is incident on the liquid crystal light valve for red light 22 and thereby modulated. The green light LG emitted from the light source 2G is incident on the liquid crystal element for green light adjustment 23a, and its intensity is adjusted here based on the histogram of a green image signal similarly to the second exemplary embodiment. Then, this light is incident on the liquid crystal light valve for green light 23 and thereby modulated. The blue light LB emitted from the light source 2B is incident on the liquid crystal element for blue light adjustment 24a, and its intensity is adjusted here based on the histogram of a blue image signal similarly to the second exemplary embodiment. Then, this light is incident on the liquid crystal light valve for blue light 24 and thereby modulated.

These three color lights modulated by these liquid crystal light valves 22, 23, and 24 are incident on the dychroic prism 25, and a color light image is formed by integrating these three color lights here. The integrated light is projected onto the screen 27 via the projection lens 26 of the optical projection system, and an enlarged image is displayed thereby.

According to the projection type liquid crystal display of the seventh exemplary embodiment, the liquid crystal elements for light adjustment are installed between the light sources 2R, 2G, 2B and the liquid crystal light valves 22, 23, 24, respectively, that are installed corresponding to these light sources. Namely, the liquid crystal elements for light adjustment are installed between the light sources and the liquid crystal light valves along the optical axes of the red light LR, the green light LG and the blue light LB, such that it is possible to adjust the intensity of any color light such as the red light LR, the green light LG and the blue light LB emitted from the light sources 2R, 2G, and 2B. Therefore, even when the light intensity of each of the light sources is fixed, the desired intensity of color light (a flux of light) can be obtained at the liquid crystal display light valve corresponding to each of the liquid crystal elements for light adjustment. Therefore, brightness can be obtained corresponding to an image. Further, when color tone of an image is deviated, light is effectively adjusted such that the dynamic range of a projection type display can be expanded, and it is advantageous in that a projection type display superior in an image expression and adaptability to operating environment can be realized.

Figure 16:
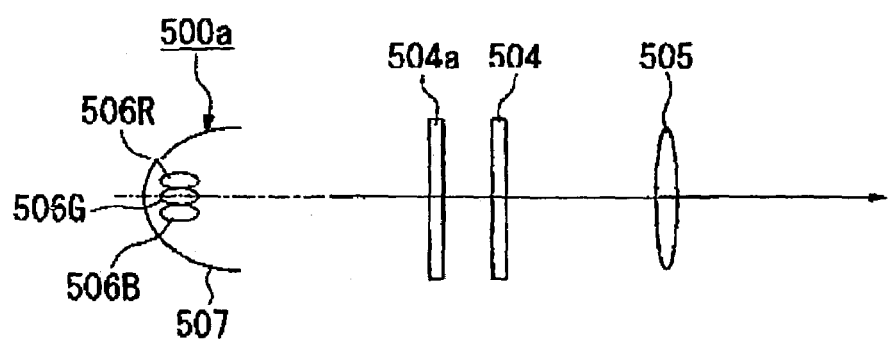
FIG. 16 is a schematic showing a projection type liquid crystal display of the eighth exemplary embodiment of the present invention.

Next, a projection type display of the eighth exemplary embodiment is described. FIG. 16 is a schematic showing a projection type liquid crystal display (liquid crystal projector) of the eighth exemplary embodiment. In the projection type liquid crystal display of the eighth exemplary embodiment, an image corresponding to each of the colors is switched sequentially by a single light valve (a light modulation device) and projected so as to realize a color display.

This figure shows a light source 500a, the first liquid crystal element for light adjustment 504a (the first light adjustment device), a liquid crystal light valve 504 (a light modulation device), and a projection lens 505. The light source 500a includes a lamp 506R emitting red light, a lamp 506G emitting green light, a lamp 506B emitting blue light and a reflector 507 reflecting light from the lamps and emitting red light, green light and blue light sequentially every one-180th second. These lamps 506R, 506G, 506B is composed of a light emitting diode (LED), an organic electroluminescence element (an organic EL element) or an inorganic electroluminescence element (an inorganic element).

Then, the first liquid crystal element for light adjustment 504a adjusts the intensity of each of the emitted color lights. Further, this light is incident onto the liquid crystal display light valve 504 and is modulated here. Further, this modulated light is projected onto a screen (not shown in the figure) by the projection lens 505 such that an enlarged image is displayed.

The first liquid crystal element for light adjustment 504a is installed between the light source 500a and the liquid crystal light valve 504 and can adjust the intensity of each color light (an flux of light) synchronously with timing of emitting each color light from the light source 500a. Further, the intensity of light (a flux of light) transmitting through the first liquid crystal element for light adjustment 504a can be adjusted by controlling the first liquid crystal element for light adjustment 504a based on information from outside.

Next, a method of driving the projection type liquid crystal display of the eighth exemplary embodiment is explained.

In this exemplary embodiment, an image signal inputted as an analog signal is inputted to DSP (1), which is a digital signal processing circuitry (a control signal determination device) through an AD converter. The DSP (1) takes out histograms of red, green, and blue colors from an image signal.

The DSP (1) determines the brightness control signal every color light during 1 frame. The brightness control signal decides voltage applied to the first liquid crystal element for light adjustment 504a based on the histogram of each color obtained from an image signal. This brightness control signal is inputted to the DSP (2) (the light adjustment control device).

On the other hand, the synchronizing signal that synchronizes timing of emitting each color light from the light source 500a with timing of driving the first liquid crystal element for light adjustment 504a is inputted to the DSP (2).

Further, the DSP (2) controls the light adjustment element driver based on the brightness control signal determined by the DSP (1) and the synchronizing signal such that the light adjustment element driver actually drives the first liquid crystal element for light adjustment 504a as the final stage.

On the other hand, after an image signal inputted to the DSP (1) is converted to an analog signal again by the DA converter, this signal is inputted to the panel driver and is supplied to the liquid crystal light valve 504 (an light modulation device) from the panel driver.

According to the projection type liquid crystal display of the eighth exemplary embodiment, the intensity of color light (a flux of light) emitted from the light source 500a can be adjusted by controlling the first liquid crystal element for light adjustment 504a based on information from outside, such that the desired intensity of each color light (a flux of light) can be obtained at the liquid crystal light valve 504, even when the light intensity of each of the light sources is fixed. Hence, the dynamic range of a projection type display can be expanded, and a projection type display superior in an image expression and adaptability to operating environment can be realized.

In addition, the technical range of the present invention is not limited to any of the preferred exemplary embodiments, and various kinds of modification can be available within the sprit of the present invention. For example, regarding the uniform illumination means, it is not limited to the fly-eye lens 3 and 4 in the above-mentioned exemplary embodiment, and appropriate modification is available such as a rod type light guide like rod lens.

In addition, as a light modulation element, an example of a light-transmissive type liquid crystal light valve is cited. On the other hand, it can be applied to a display provided with a reflective type liquid crystal light valve and a DMD.

Also, in the preferred exemplary embodiment, the case of adjusting a flux of light irradiating all area to be illuminated, of the liquid crystal light valve (a light modulation means), was explained. On the other hand, when the liquid crystal light valve is divided into plural areas, a flux of light irradiating each area can be adjusted.

Furthermore, in the second to eighth preferred exemplary embodiments, an example of projection type liquid crystal display, provided with liquid crystal light valves as the first and the second light modulation device was explained. On the other hand, the present invention can be applied to a projection type display provided with a shutter of a roll screen method or a disk rotary method as the first and/or the second light modulation device.

The invention claimed is:

1. A projection type display, comprising:
   an illumination device;
   a light modulation device that modulates light emitted from the illumination device; and
   a projection device that projects light modulated by the light modulation device;
   the illumination device being provided with a light source, a uniform illumination device making a distribution of illumination of light incident from the light source uniform, and a liquid crystal element for light adjustment, installed on an optical axis of light emitted from the light source, for adjusting the flux of light emitted from the light source,
   a flux of light emitted from the illumination device per unit time is adjustable by driving the liquid crystal element for light adjustment with time-sharing between a high transmittance ratio and a low transmittance ratio in response to information from outside, and
   a signal applied to the light modulation device being changed based on a signal supplied to the liquid crystal element for light adjustment, such that color tone being changed by the liquid crystal element for light adjustment, the changed color tone of light emitted from the liquid crystal element for light adjustment being correctable by the light modulation device.

2. The projection type display according to claim 1, the illumination device being provided with two fly-eye lenses composed of a first fly-eye lens and a second fly-eye lens arranged in order from the side nearest to the light source along the optical axis.

3. The projection type display according to claim 1, the illumination device being a rod state light guide body dividing light form the light source into a plurality of light fluxes by using reflection and emitting them.

4. The projection type display according to claim 1, further comprising:
   a control signal determination device that determines a control signal to control the liquid crystal element for light adjustment based on an image signal; and a light adjustment control device controlling the liquid crystal element for light adjustment based on the control signal.

5. The projection type display according to claim 1, further comprising:
a light modulation control signal determination device that determines a control signal to control the light modulation device based on the control signal that controls the liquid crystal element for light adjustment; and a light modulation control device that controls the light modulation device based on the control signal determined by the light modulation control signal determination device.

6. A projection type display, comprising:
an illumination device;
a light modulation device that modulates light emitted from the illumination device; and
a projection device that projects light modulated by the light modulation device;
the illumination device being provided with a light source, a uniform illumination device making a distribution of illumination of light incident from the light source uniform, and a liquid crystal element for light adjustment, installed on an optical axis of light emitted from the light source, for adjusting the flux of light emitted from the light source,
a flux of light emitted from the illumination device per unit time is adjustable by driving the liquid crystal element for light adjustment with time-sharing between a high transmittance ratio and a low transmittance ratio in response to information from outside, and
a period of applying voltage to the light modulation device being changed based on a signal supplied to the liquid crystal element for light adjustment such that color tone being changed by the liquid crystal element for light adjustment, the changed color tone of light emitted from the liquid crystal element for light adjustment being correctable by the light modulation device.

7. A method of driving a projection type display including a liquid crystal element for light adjustment and a light modulation device, comprising:
adjusting a flux of light emitted from an illumination device with time-sharing between a high transmittance ratio and a low transmittance ratio; and
projecting the light;
a control signal to control the liquid crystal element for light adjustment being determined based on an image signal, and the liquid crystal element for light adjustment is controlled based on the control signal such that a quantity of light irradiated to a light modulation device is adjusted; and
the control signal to control the liquid crystal element for light adjustment being determined based on the image signal, and the liquid crystal element for light adjustment is controlled based on the control signal such that a flux of light irradiated to the light modulation device is adjusted, while a control signal to control the light modulation device is determined based on the control signal to control the liquid crystal element for light adjustment, and the light modulation device is controlled based on the control signal such that color tone being changed by the liquid crystal element for light adjustment, the changed color tone of light emitted from the liquid crystal element for light adjustment being corrected by the light modulation device.

8. A display, comprising:
an illumination device; and
a light modulation device that modulates light emitted from the illumination device;
the illumination device being provided with a light source, a uniform illumination device making a distribution of illumination of light incident from the light source uniform, and a liquid crystal element for light adjustment, installed on an optical axis of light emitted from the light source, to adjust the intensity of light emitted from the light source,
a flux of light emitted from the illumination device per unit time is adjustable by driving the liquid crystal element for light adjustment with time-sharing between a high transmittance ratio and a low transmittance ratio in response to information from outside, and
a signal applied to the light modulation device being changed based on a signal supplied to the liquid crystal element for light adjustment such that color tone being changed by the liquid crystal element for light adjustment, the changed color tone of light emitted from the liquid crystal element for light adjustment being correctable by the light modulation device.

9. The display according to claim 8, further comprising:
a control signal determination device that determines a control signal to control the liquid crystal element for light adjustment based on an image signal and a light adjustment control device controlling the liquid crystal element for light adjustment based on the control signal.

10. The display according to claim 8 further comprising:
a light modulation control signal determination device that determines a control signal to control the light modulation device based on a control signal that controls the liquid crystal element for light adjustment and a light modulation control device that controls the light modulation device based on the control signal determined by the light modulation control signal determination device.

11. A display, comprising:
an illumination device; and
a light modulation device that modulates light emitted from the illumination device;
the illumination device being provided with a light source, a uniform illumination device making a distribution of illumination of light incident from the light source uniform, and a liquid crystal element for light adjustment, installed on an optical axis of light emitted from the light source, to adjust the intensity of light emitted from the light source,
a flux of light emitted from the illumination device per unit time is adjustable by driving the liquid crystal element for light adjustment with time-sharing between a high transmittance ratio and a low transmittance ratio in response to information from outside, and
a period of applying voltage to the light modulation device being changed based on a signal supplied to the liquid crystal element for light adjustment such that color tone being changed by the liquid crystal element for light adjustment, the changed color tone of light emitted from the liquid crystal element for light adjustment being correctable by the light modulation device.

12. A method of driving a display, including a liquid crystal element for light adjustment and a light modulation device, comprising:
adjusting a flux of light emitted from an illumination device with time-sharing between a high transmittance ratio and a low transmittance ratio to display the light,
a control signal that controls the liquid crystal element for light adjustment being determined based on an image signal, and the liquid crystal element for light adjustment being controlled based on the control signal, such that a flux of light irradiated to the light modulation device is adjusted;

the control signal that controls the liquid crystal element for light adjustment being determined based on the image signal, and the liquid crystal element for light adjustment being controlled based on the control signal, such that a flux of light irradiated to the light modulation device is adjusted, while a control signal that controls the light modulation device being determined based on the control signal to control the liquid crystal element for light adjustment, and the light modulation device being controlled based on the control signal such that color tone being changed by the liquid crystal element for light adjustment, the changed color tone of light emitted from the liquid crystal element for light adjustment being corrected by the light modulation device.

* * * * *